US012585286B2

(12) United States Patent
Miyashita et al.

(10) Patent No.: US 12,585,286 B2
(45) Date of Patent: Mar. 24, 2026

(54) MAP GENERATION SYSTEM AND MAP GENERATION METHOD

(71) Applicant: Kubota Corporation, Osaka (JP)

(72) Inventors: Shunsuke Miyashita, Sakai (JP);
Yusuke Murata, Sakai (JP)

(73) Assignee: KUBOTA CORPORATION, Osaka
(JP)

( * ) Notice: Subject to any disclaimer, the term of this
patent is extended or adjusted under 35
U.S.C. 154(b) by 29 days.

(21) Appl. No.: 18/738,173

(22) Filed: Jun. 10, 2024

(65) Prior Publication Data

US 2024/0329654 A1 Oct. 3, 2024

Related U.S. Application Data

(63) Continuation of application No.
PCT/JP2022/040394, filed on Oct. 28, 2022.

(30) Foreign Application Priority Data

Dec. 17, 2021 (JP) ................................. 2021-205037

(51) Int. Cl.
G05D 1/246 (2024.01)
G05D 1/248 (2024.01)
(Continued)

(52) U.S. Cl.
CPC ........... G05D 1/2462 (2024.01); G05D 1/248
(2024.01); *G05D 2105/15* (2024.01); *G05D*
*2111/10* (2024.01)

(58) Field of Classification Search
CPC .... G05D 1/246; G05D 1/248; G05D 2105/15;
G05D 2111/10; G05D 1/242;
(Continued)

(56) References Cited

U.S. PATENT DOCUMENTS 6,728,608 B2 * 4/2004 Ollis ..................... G05D 1/0274
701/28
2014/0005933 A1 * 1/2014 Fong ..................... G05D 1/0246
701/447

(Continued)

FOREIGN PATENT DOCUMENTS

CN 110321184 A 10/2019
EP 3647733 A1 5/2020
(Continued)

OTHER PUBLICATIONS

Machine translation of CN 110321184 retrieved from espacenet on
Sep. 4, 2025 (Year: 2025).*

(Continued)

*Primary Examiner* — Thomas Ingram
(74) *Attorney, Agent, or Firm* — Keating & Bennett, LLP

(57) ABSTRACT

A map generation system generates map data for an agri-
cultural machine to automatically travel on a road around a
field, and includes a storage to store feature block images
associated with different types of road features, and a
processor configured or programmed to acquire position
distribution data on one or more types of road features, the
position distribution data being generated based on at least
one of sensor data from a LiDAR sensor and image data
from an imager output while a movable body including at
least one of the LiDAR sensor and the imager is moving
along the road; read from the storage one or more types of
feature block images associated with the one or more types
of features; and align the feature block images in accordance
with the position distribution data to generate map data on
a region including the road.

16 Claims, 21 Drawing Sheets

(51) Int. Cl.
   _G05D 105/15_        (2024.01)
   _G05D 111/10_        (2024.01)
(58) Field of Classification Search
   CPC ............... G05D 1/243; G05D 2107/13; G05D
       2107/21; G05D 2109/10; G05D 2111/17;
       G01C 21/3867; G09B 29/003; A01B
                   76/00; A01B 69/008
   See application file for complete search history.

(56)                References Cited

U.S. PATENT DOCUMENTS

2019/0091865 A1*   3/2019 Amacker ............... B25J 9/0003
2021/0018929 A1*   1/2021 Choi ...................... G05D 1/249

FOREIGN PATENT DOCUMENTS

EP       3 766 320 A1   1/2021
JP      2019082999 A    5/2019
JP      2019-154379 A   9/2019
JP       2021-29218 A   3/2021
JP       2021-73602 A   5/2021

OTHER PUBLICATIONS

Official Communication issued in International Patent Application
No. PCT/JP2022/040394, mailed on Jan. 17, 2023.

* cited by examiner

*FIG. 2B*

START

ACQUIRE POSITION DISTRIBUTION DATA ON FEATURES — S11

READ FEATURE BLOCK IMAGES CORRESPONDING TO ONE OR MORE TYPES OF FEATURES IN THE POSITION DISTRIBUTION DATA ON THE FEATURES — S12

ALIGN THE FEATURE BLOCK IMAGES IN ACCORDANCE WITH THE POSITION DISTRIBUTION DATA ON THE FEATURES TO GENERATE MAP DATA — S13

END

| FIELD | ENTRANCE/ EXIT OF FIELD | GRASS | ROAD | TREE | WATERWAY | DITCH | HOUSE | BUILDING |
|---|---|---|---|---|---|---|---|---|

Figure 5:
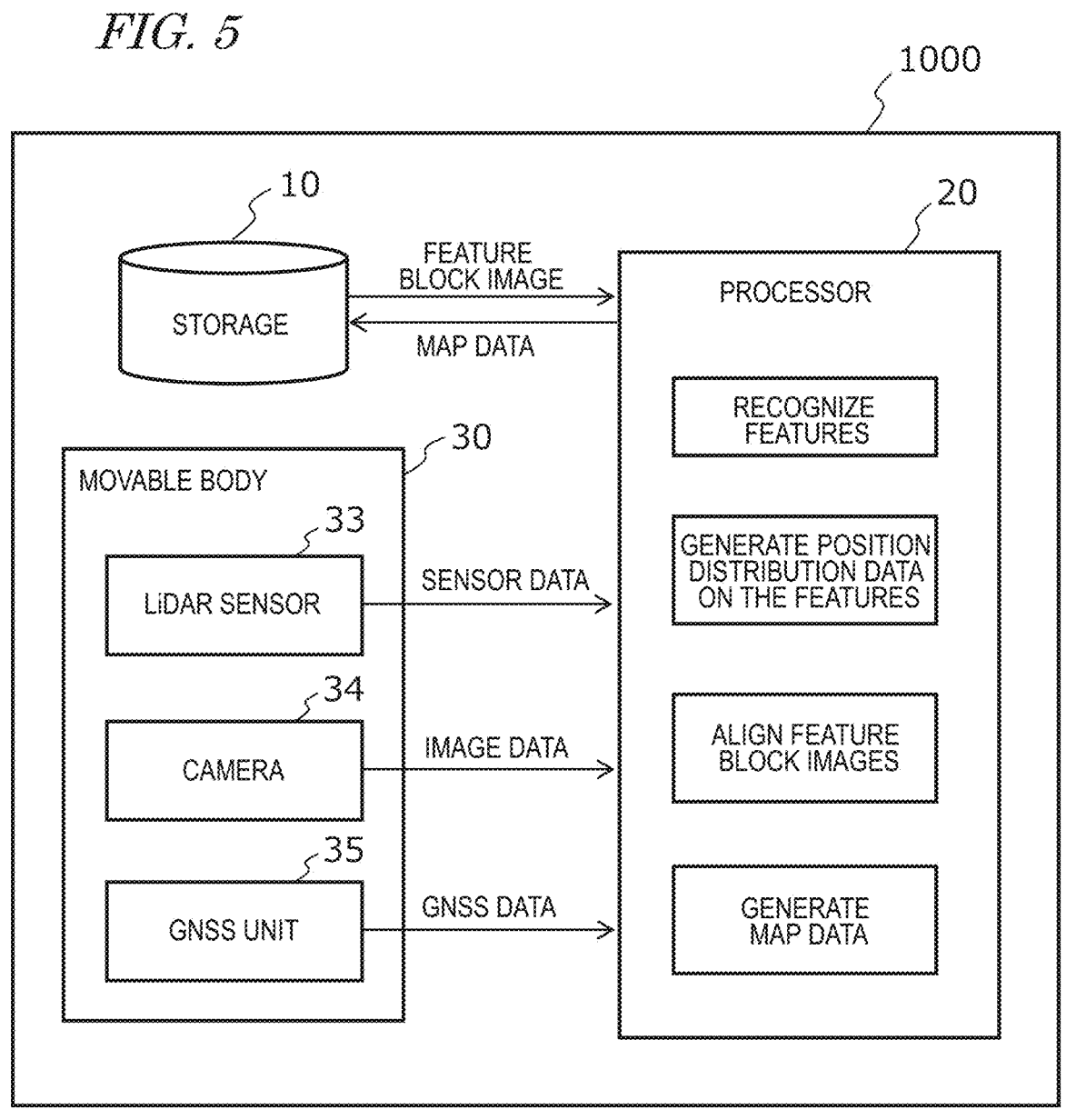

STORAGE

FEATURE
BLOCK IMAGE

MAP DATA

20

PROCESSOR

RECOGNIZE
FEATURES

GENERATE POSITION
DISTRIBUTION DATA
ON THE FEATURES

ALIGN FEATURE
BLOCK IMAGES

GENERATE
MAP DATA

30

MOVABLE BODY

33

LiDAR SENSOR

SENSOR DATA

34

CAMERA

IMAGE DATA

35

GNSS UNIT

GNSS DATA

| AGRICULTURAL MACHINE | DATE/TIME | FIELD | TASK | IMPLEMENT |
|---|---|---|---|---|
| AGRICULTURAL MACHINE A | JUNE 21, 2021,   8:00 – 11:00 | FIELD A | SPRAYING AGRICULTURAL CHEMICALS | IMPLEMENT A |
| AGRICULTURAL MACHINE A | JUNE 21, 2021,   12:00 – 14:00 | FIELD B | SPRAYING AGRICULTURAL CHEMICALS | IMPLEMENT A |
| AGRICULTURAL MACHINE A | JUNE 21, 2021,   15:00 – 18:00 | FIELD C | TILLING | IMPLEMENT B |
| AGRICULTURAL MACHINE A | JUNE 22, 2021,   8:00 – 12:00 | FIELD D | TILLING | IMPLEMENT B |
| ⋮ | ⋮ | ⋮ | ⋮ | ⋮ |

76

31p

31

40

31p

70

31p

32p

32

100

31p

MAP GENERATION SYSTEM AND MAP GENERATION METHOD

CROSS REFERENCE TO RELATED APPLICATIONS

This application claims the benefit of priority to Japanese Patent Application No. 2021-205037 filed on Dec. 17, 2021 and is a Continuation Application of PCT Application No. PCT/JP2022/040394 filed on Oct. 28, 2022. The entire contents of each application are hereby incorporated herein by reference.

BACKGROUND OF THE INVENTION

1. Field of the Invention

The present disclosure relates to map generation systems and map generation methods.

2. Description of the Related Art

Research and development has been directed to the automation of agricultural machines to be used in agricultural fields. For example, work vehicles, such as tractors, combines, and rice transplanters, which automatically travel within fields by utilizing a positioning system, e.g., a GNSS (Global Navigation Satellite System), are coming into practical use. Research and development is also under way for work vehicles which automatically travel not only within fields, but also outside the fields.

Japanese Laid-Open Patent Publication No. 2021-073602 and Japanese Laid-Open Patent Publication No. 2021-029218 each disclose an example of system to cause an unmanned work vehicle to automatically travel between two fields separated from each other with a road being sandwiched therebetween.

Meanwhile, development of movable bodies autonomously moving by use of a distance sensor such as a LiDAR (Light Detection and Ranging) sensor is also under way. For example, Japanese Laid-Open Patent Publication No. 2019-154379 discloses an example of work vehicle automatically traveling between rows of crops by use of a LiDAR sensor.

SUMMARY OF THE INVENTION

In order to allow an agricultural machine to automatically travel on a road outside a field (e.g., an agricultural road or a general road) in addition to inside the field, a map of an area outside the field is necessary. Such a map may be used to generate a path for self-traveling of the agricultural machine or to display the position of the agricultural machine during the self-traveling.

Example embodiments of the present invention provide systems and methods to efficiently generate map data for agricultural machines performing self-traveling in environments including fields and roads around the fields.

A map generation system according to an example embodiment of the present disclosure generates map data for an agricultural machine automatically traveling on a road around a field. The map generation system includes a storage to store a plurality of feature block images respectively associated with a plurality of types of features existing around the road, and a processor configured or programmed to acquire position distribution data on one or more types of features existing around the road. The position distribution data on the features is generated based on at least one of sensor data from a LiDAR sensor and image data from an imager, the sensor data and the image data being output while a movable body including at least one of the LiDAR sensor and the imager is moving along the road. The processor is configured or programmed to read, from the storage, one or more types of feature block images associated with the one or more types of features, and align the feature block images in accordance with the position distribution data to generate map data on a region including the road.

General or specific aspects of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be disposed within a single apparatus, or divided over two or more separate apparatuses.

According to example embodiments of the present disclosure, it is possible to efficiently generate map data for agricultural machines performing self-traveling in environments including fields and roads around the fields.

The above and other elements, features, steps, characteristics and advantages of the present invention will become more apparent from the following detailed description of the example embodiments with reference to the attached drawings.

BRIEF DESCRIPTION OF DRAWINGS

FIG. 2B is a diagram showing an example of screen to set the size of one feature block image.

FIG. 5 shows another example configuration of the map generation system.

FIG. 18 is a table showing an example of schedule of agricultural work created by the management device.

DETAILED DESCRIPTION OF THE EXAMPLE EMBODIMENTS

Figure 1:
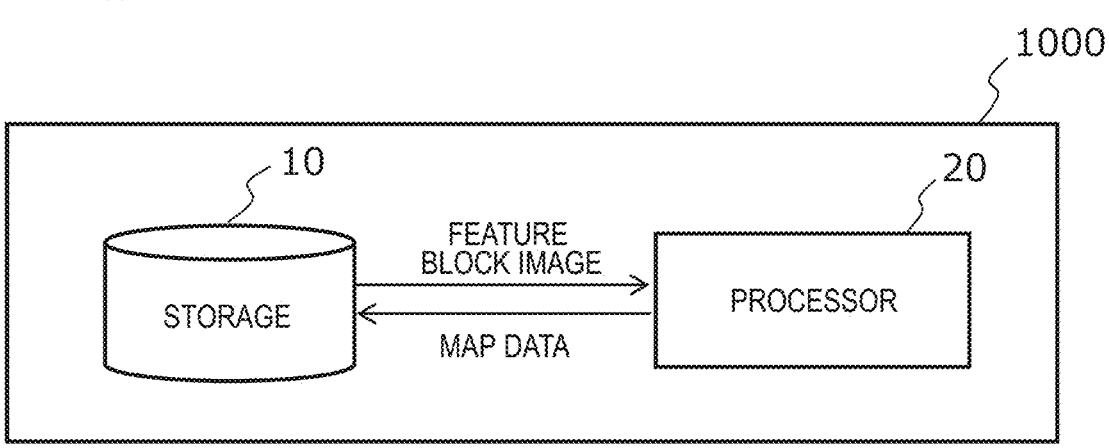
FIG. 1 is a block diagram showing an example configuration of a map generation system.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of the implement) may be controlled automatically. In the case where the agricultural machine is a vehicle-type machine, travel of the agricultural machine via self-driving will be referred to as "self-traveling". The controller may be configured or programmed to control at least one of: steering that is required in the movement of the agricultural machine, adjustment of the moving speed, or beginning and ending of a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc. may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous move, operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. In particular, the work plan including information representing the time and the date when each of the tasks of agricultural work is to be performed is referred to as a "work schedule" or simply as a "schedule". The work schedule may include information representing the time when each task of agricultural work is to be begun and/or ended on each of working days. The work plan or the work schedule may include information representing, for each task of agricultural work, the contents of the task, the implement to be used, and/or the types and amounts of agricultural supplies to be used. As used herein, the term "agricultural supplies" refers to goods used for agricultural work to be performed by an agricultural machine. The agricultural supplies may also be referred to simply as "supplies". The agricultural supplies may include goods consumed by agricultural work such as, for example, agricultural chemicals, fertilizers, seeds, or seedlings. The work plan may be created by a processor communicating with the agricultural machine to manage the agricultural machine or a processor mounted on the agricultural machine. The processor can create a work plan based on, for example, information input by the user (agricultural business executive, agricultural worker, etc.) manipulating a terminal device. In this specification, the processor communicating with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

A "feature" refers to an object existing on the earth. Examples of features include grass, trees, roads, fields, waterways, ditches, rivers, bridges, forests, mountains, rocks, buildings, railroad tracks, and the like. Borders, names of places, names of buildings, names of fields, names of railroad lines and the like, which do not exist in the real world, are not encompassed in the "feature" according to the present disclosure.

A "feature block image" refers to an image of a predetermined size that represents a feature, or data of the image data. The feature block image may be an image representing a feature in a simple manner. The feature block image may be, for example, a bitmap image (i.e., raster image) of a low resolution such as a pixel art image, or may be a vector image of a relatively small size. The feature block image may be a color image or a monochrome image. The feature block image is not limited to two-dimensional data, and may be three-dimensional data including information on height. One or more types of feature block images can be aligned to generate a simple environment map representing an environment around a road on which an agricultural machine is to travel. The environment map generated by aligning such feature block images is not limited to two-dimensional data, and may be three-dimensional data including information on height.

A "global path" is data on a path connecting a departure point to a target point of an automatic movement of the agricultural machine, and is generated by a processor performing path planning. Generation of such a global path is referred to as "global path planning". In the following description, the global path will be referred to also as a "target path" or simply as a "path". The global path may be defined by, for example, coordinate values of a plurality of points which the agricultural machine is to pass. Such a point that the agricultural machine is to pass is referred as a "waypoint", and a line segment connecting waypoints adjacent to each other is referred to as a "link".

A "local path" is a path by which the agricultural machine can avoid an obstacle, and is consecutively generated while the agricultural machine is automatically moving along the global path. Generation of such a local path is referred to as "local path planning". The local path is consecutively generated based on data acquired by one or more sensing devices included in the agricultural machine, during a movement of the agricultural machine. The local path may be defined by a plurality of waypoints along a portion of the global path. Note that in the case where there is an obstacle in the vicinity of the global path, the waypoints may be set so as to detour around the obstacle. The length of a link between the waypoints on the local path is shorter than the length of a link between the waypoints on the global path. The device generating the local path may be the same as, or different from, the device generating the global path. For example, the management device managing the agricultural work to be performed by the agricultural machine may generate the global path, whereas the controller mounted on the agricultural machine may generate the local path. In this case, a combination of the management device and the controller is configured or programmed to function as a "processor" to perform the path planning. The controller of the agricultural machine may be configured or programmed to function as a processor to perform both of global path planning and local path planning.

An "agricultural road" is a road used mainly for agriculture. An "agricultural road" is not limited to a road paved with asphalt, and encompasses unpaved roads covered with soil, gravel or the like. An "agricultural road" encompasses roads (including private roads) on which only vehicle-type agricultural machines (e.g., work vehicles such as tractors, etc.) are allowed to travel and roads on which general vehicles (automobiles, trucks, buses, etc.) are also allowed to travel. The work vehicles may automatically travel on a general road in addition to an agricultural road. The "general road" is a road maintained for traffic of general vehicles.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are included in the following example embodiments are only exemplary, and allow for various modifications so long as it makes technological sense. Any one implementation may be combined with another so long as it makes technological sense to do so.

An example configuration of a map generation system according to an illustrative example embodiment of the present disclosure will be described.

FIG. 1 is a block diagram showing an example configuration of a map generation system 1000. The map generation system 1000 generates map data for an agricultural machine (e.g., a work vehicle such as a tractor) automatically traveling in a field and also on a road around the field. The map generation system 1000 includes a storage 10 and a processor 20.

The storage 10 includes at least one storage medium such as, for example, a semiconductor storage medium, a magnetic storage medium or an optical storage medium. The storage 10 stores one or more types of feature block images associated with one or more types of features that may exist around a road on which the agricultural machine is to travel (e.g., an agricultural road or a general road). The feature block image may be an image representing a feature that may exist around the road (e.g., grass, tree, ditch, waterway, bridge, field, building, mountain, forest, etc.) in a simple manner. The storage 10 may further store a feature block image associated with the road (hereinafter, referred to also as a "road block image"). Such a feature block image may be, for example, a bitmap image of a relatively low resolution such as a pixel art image. The feature block image is not limited to a bitmap image, and may be an image of a different format such as a vector image.

Figure 2A:
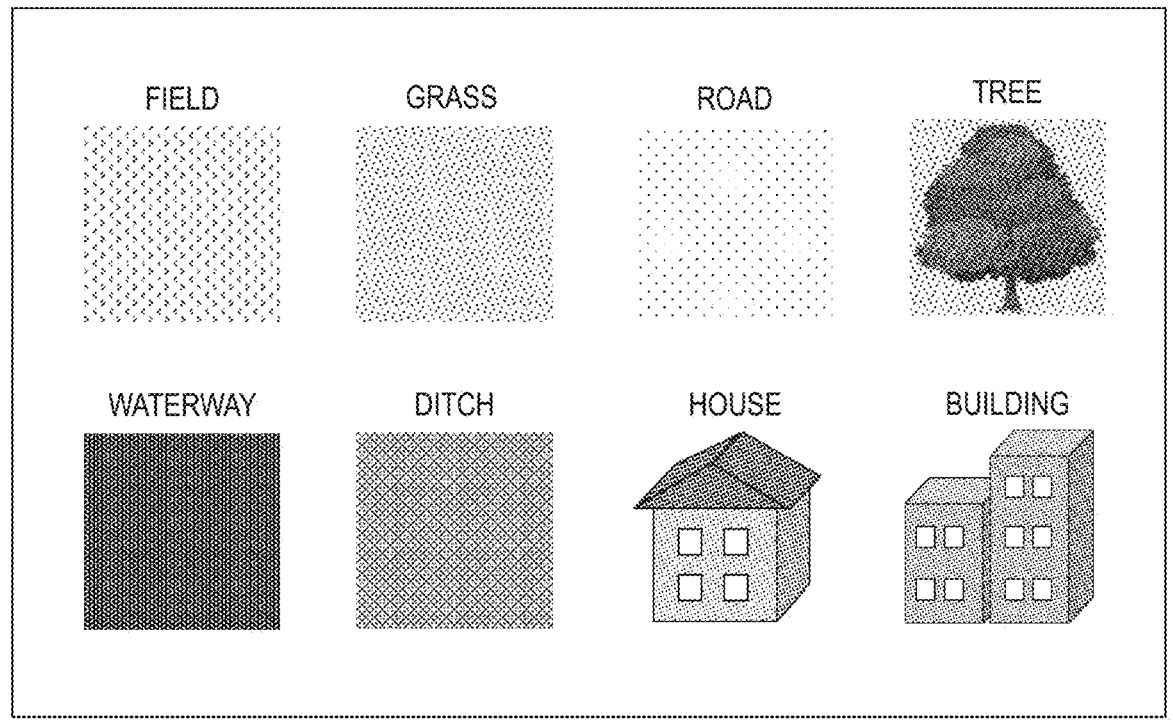
FIG. 2A is a diagram showing examples of feature block images.

FIG. 2A shows examples of feature block images. In this example, the storage 10 stores a plurality of pixel art images respectively representing a plurality of types of features, as a plurality of feature block images. FIG. 2A shows, as examples, eight types of feature block images of the field, grass, road, tree, waterway, ditch, house and building. The feature block images shown in FIG. 2A are each a pixel art image having a relatively small size (e.g., about 32 pixels× about 32 pixels to about 256 pixels×about 256 pixels). Such feature block images may be previously created and stored in the storage 10. The processor 20 can align these feature block images to generate a map of an environment where an agricultural machine is to perform self-traveling. The feature block images are not limited to the eight types of images shown here, and may be seven or less types of images or nine or more types of images. Only one type of feature block images may be provided. For example, only the feature block images representing the road, or only one type of feature block images representing a feature other than the road, may be stored in the storage 10. Even in this case, the processor 20 can generate a simple map allowing the road, on which the agricultural machine is to travel, to be distinguished from features other than the road.

Each feature block image may have a size (e.g., a width and a height) that is previously set to a fixed value or is manually set by a manager of the system or a user of the agricultural machine. For example, the manager or the user may be allowed to set the size of one feature block image by use of a terminal device communicable with the processor 20.

Figure 2B:
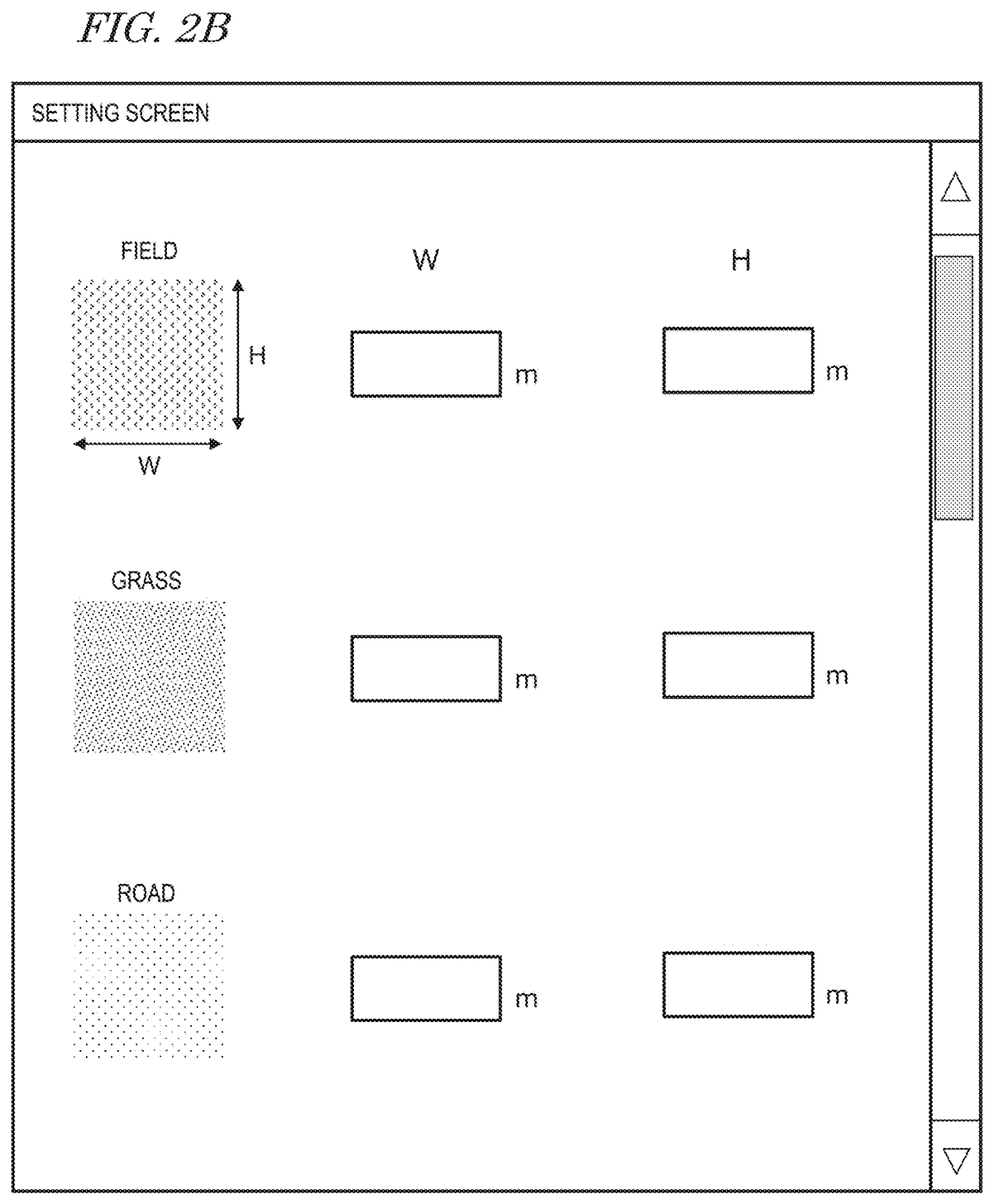

FIG. 2B shows an example of screen to set the size of one feature block image. The setting screen shown in FIG. 2B is an example of graphical user interface (GUI) to set the width W (i.e., a length in a transverse direction) and the height H (i.e., a length in a longitudinal direction) of each of the plurality of feature block images. As in this example, the processor 20 can display the GUI to set the width and the height of each feature block image, on a display screen of the terminal device.

With the setting screen as shown in FIG. 2B, it can be set how much length (e.g., in meters) in the real world corresponds to the width W and the height H of each of the plurality of feature block images (including the road block image). The manager or the user can manipulate the terminal device to set the width W and the height H of each of the plurality of feature block images of the field, grass, road, tree, waterway, ditch, house, building and the like. When the width W and the height H of each of the plurality of feature block images are set, each feature block image is stored in the storage 10 as being associated with the width W and the height H thus set. The processor 20 aligns one or more types of feature block images each having the width W and the height H set on the GUI to generate map data.

In the example shown in FIG. 2B, the aspect ratio of each feature block image may be automatically changed in accordance with the settings of the width W and the height H. The aspect ratio is expressed by, for example, the value of "width W:height H". In the case where the width W and the height H of a feature block image are of the same value, the aspect ratio of the feature block image is set to "1:1", for example. By contrast, in the case where the width W is 1.0 m and the height H is 2.0 m, the aspect ratio of the feature block image is set to "1:2", for example. The aspect ratio of the feature block image may be set by the terminal device displaying the setting screen or by the processor 20.

In the example shown in FIG. 2B, one feature block image is prepared for each type of feature, and the width W and the height H are set for each feature block image. Alternatively, for example, a plurality of feature block images may be prepared for each type of feature, and the width W and the height H may be allowed to set for each of the feature block images.

In the present example embodiment, a function of setting the size of one feature block image in accordance with the type of feature is provided. With this function, a map reflecting the actual positional arrangement of the features more accurately can be generated.

Instead of the function of setting the size of each feature block image being provided, the width W and the height H of each feature block image may be fixed to a length suitable to the corresponding type of feature. Even in this case, a preferred map can be generated by a map generation process described below.

The processor 20 may be a computer including at least one processor and at least one memory. The processor 20 performs an operation of generating a map by the processor executing a computer program stored in the memory. The processor 20 may be an assembly of a plurality of computers. For example, the processor 20 may include a plurality of computers communicably connected with each other via a network such as the Internet.

Figure 3A:
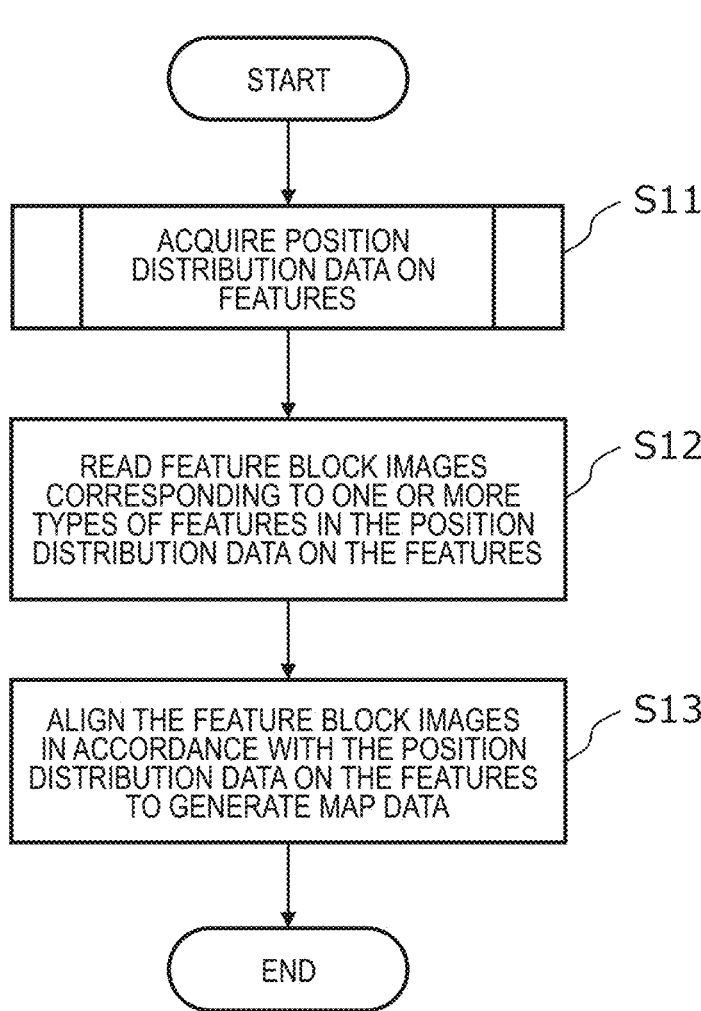
FIG. 3A is a flowchart showing a basic operation of a processor.

FIG. 3A is a flowchart showing a basic operation of the processor 20. The processor 20 can be configured or programmed to perform the operation from steps S11 to S13 shown in FIG. 3A to generate map data on an environment where the agricultural machine is to travel. Hereinafter, the operation of each of the steps will be described.

Step S11

The processor 20 acquires position distribution data on one or more types of features existing around the road on which the agricultural machine is to travel. The position distribution data on the features may be generated based on at least one of sensor data from a LiDAR sensor and image data from an imager, the sensor data and the image data being output while a movable body including at least one of the LiDAR sensor and the imager is moving along the road. The movable body may be a work vehicle that is the same as the agricultural machine or a movable body different from the agricultural machine (e.g., a drone, that is, an unmanned aerial vehicle (UAV)). The position distribution data on the features may represent which of the features exist at which position in the environment where the agricultural machine is to travel. The position distribution data on the features may be represented by, for example, a combination of a position (e.g., a latitude and a longitude) in a global coordinate system (e.g., geographic coordinate system) fixed to the globe and an identifier representing the type of the feature at the position.

The position distribution data on the features may be generated by the processor 20 itself or another device. For example, another device such as a computer mounted on the movable body or a server computer on the cloud may generate the position distribution data on the features, and transmit the position distribution data to the processor 20. The processor 20 or the another device may recognize one or more types of features existing around the road based on at least one of the sensor data and the image data, and generate position distribution data on the recognized one or more types of features. The recognized features may be at least one type among, for example, grass, tree, ditch, waterway, field and building. The processor 20 or the another device can generate the position distribution data on the recognized features based on GNSS data output from a GNSS receiver included in the movable body and the sensor data. A more specific example of process of step S11 will be described below.

Step S12

The processor 20 reads, from the storage 10, one or more feature block images associated with the one or more types of features in the position distribution data on the features acquired in step S11. In the case where, for example, the position distribution data on the features includes positional information on the eight types of features shown in FIG. 2A, the processor 20 reads the feature block images corresponding to these features.

Step S13

The processor 20 aligns the feature block images read in step S12, in accordance with the position distribution data on the features acquired in step S11 to generate map data on a region including the road on which the agricultural machine is to travel. More specifically, the processor 20 aligns one or more feature block images associated with the recognized one or more features, in the region in which the features exist on the map data, in accordance with the position distribution data on the features, and thus generates the map data. For example, the processor 20 can generate the map data by executing a process including steps S1 to S5 described below on each of the one or more types of features.

(S1) Determine the length in the transverse direction and the length in the longitudinal direction of a series of regions occupied by the feature, in accordance with the position distribution data. Herein, the transverse direction corresponds to the direction of the width of the feature block image, and the longitudinal direction corresponds to the direction of the height of the feature block image.

(S2) Divide the length in the transverse direction by the width of the feature block image corresponding to the feature, and thus determine a transverse number of feature block images.

(S3) Divide the length in the longitudinal direction by the height of the feature block image corresponding to the feature, and thus determine a longitudinal number of feature block images.

(S4) Align the feature block images by the transverse number in the transverse direction.

(S5) Align the feature block images by the longitudinal number in the longitudinal direction.

The steps (S1) to (S5) may be preferably applied in the case where the feature has a planar shape that can be approximated by a rectangle. In the case where the planar shape of the feature cannot be approximated by a rectangle, the region occupied by the feature is divided into a plurality of rectangular or strip-shaped regions having different sizes, and the process including steps (S1) to (S5) is applied to each of the regions. Thus, the map data can be generated.

Hereinafter, an example of process of aligning the feature block images will be described in detail with reference to FIG. 3B.

Figure 3B:
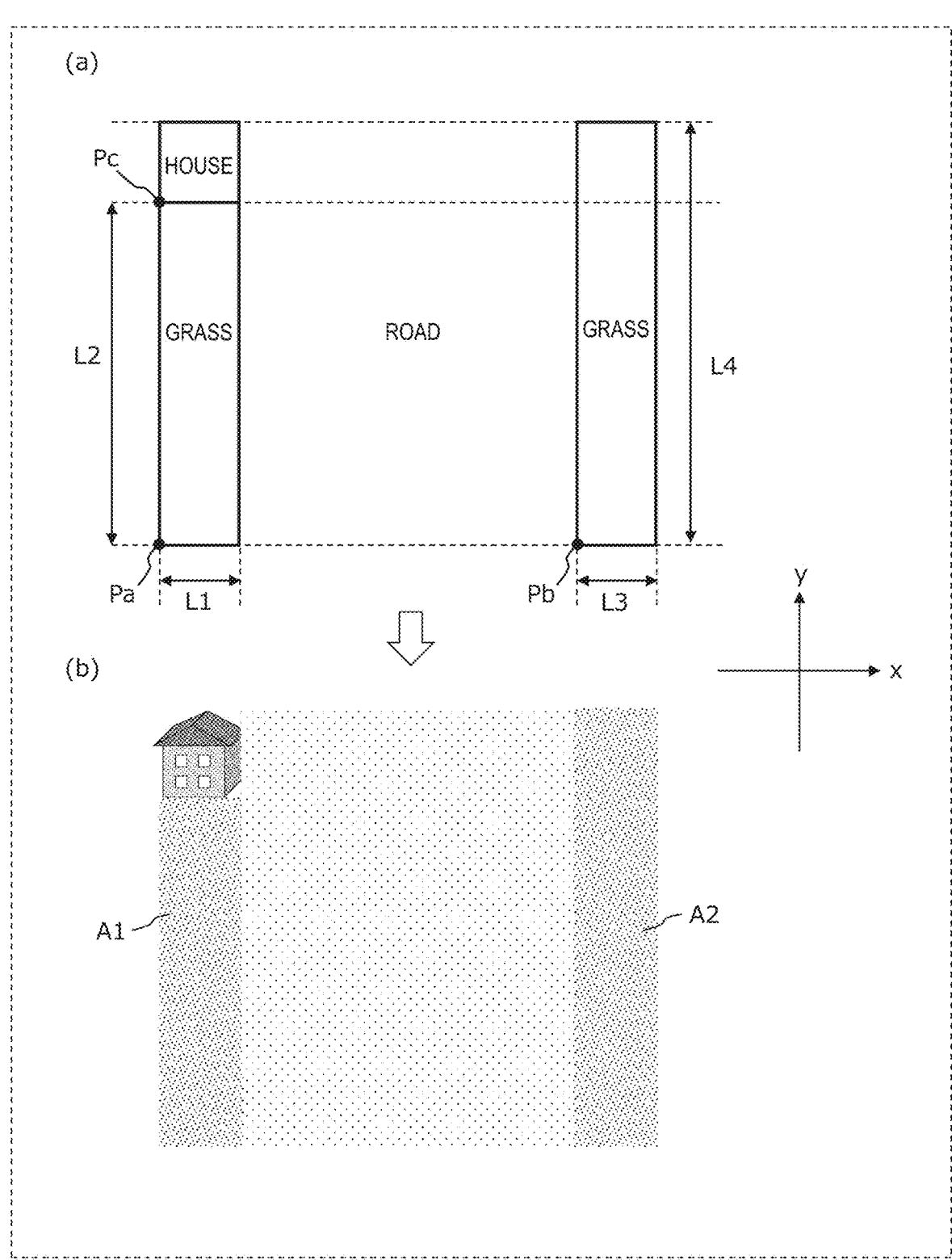
FIG. 3B is a diagram showing an example of relationship between position distribution data on features and map data.

FIG. 3B shows an example of relationship between position distribution data on features and map data generated by aligning one or more types of feature block images. Part (a) in the upper half of FIG. 3B shows an example of positional arrangement of the features represented by the position distribution data. Part (b) in the lower half of FIG. 3B shows an example of generated map. The following description will be made by use of an xy coordinate system shown in FIG. 3B. An x axis and a y axis cross each other perpendicularly. A direction of the x axis will be referred to as a "transverse direction", and a direction of the y axis will be referred to as a "longitudinal direction". The transverse direction corresponds to the width direction of the feature block images, and the longitudinal direction corresponds to the height direction of the feature block images. In this example, the position distribution data on the features includes positional arrangement information on the grass, the road and the house. For easier understanding, it is assumed that a series of regions occupied by each of the grass, the road and the house has a rectangular planar shape having two sides parallel to the x axis and two sides parallel to the y axis.

In the example shown in FIG. 3B, the processor 20 sets an arbitrary point in the position distribution data as a reference point, and acquires positional information on each of the features such as the grass, the road, the house and the like represented by the position distribution data, along the transverse direction and along the longitudinal direction from the reference point. Thus, the processor 20 specifies the series of regions occupied by each feature. For example, regarding the grass on the left side of FIG. 3B, a region having a length L1 in the transverse direction from reference point Pa and a length L2 in the longitudinal direction from reference point Pa is specified as a region occupied by the grass on the left side. The processor 20 divides the length L1, in the transverse direction, of the grass on the left side by the width W of the feature block image representing the grass to find the number of feature block images to be aligned in the transverse direction (hereinafter, such an number will be referred to as a "transverse number"). The processor 20 divides the length L2, in the longitudinal direction, of the grass on the left side by the height H of the feature block image representing the grass to find the number of feature block images to be aligned in the longitudinal direction (hereinafter, such an number will be referred to as a "longitudinal number"). The processor 20 aligns the feature block images by the transverse number in the transverse direction sequentially from reference point Pa, and aligns the feature block images by the longitudinal number in the longitudinal direction sequentially from reference point Pa. As a result, as shown in the lower half of FIG. 3B, region A1 of the grass on the left side in the map can be generated.

There is a case where division of the length L1 in the transverse direction with the width W of the feature block image or division of the length L2 in the longitudinal direction with the height H of the feature block image does not result in an integer. In this case, the processor 20 may enlarge or contract a portion of the feature block images to be aligned in at least one of the transverse direction and the longitudinal direction, and thus generate map data corresponding to the position distribution data on the features.

Regarding the grass on the right side, the processor 20 determines a length L3 in the transverse direction and a length L4 in the longitudinal direction of a region of the grass on the right side based on the position distribution data in substantially the same manner as described above. The processor 20 finds the transverse number by an arithmetic operation of L3/W, and finds the longitudinal number by an arithmetic operation of L4/H. The processor 20 aligns the feature block images by the transverse number in the transverse direction from reference point Pb, and aligns the feature block images by the longitudinal number in the longitudinal direction from reference point Pb. As a result, region A2 of the grass on the right side in the map can be generated.

The processor 20 executes substantially the same process as described above regarding the road and the house. The processor 20 searches for features in the transverse direction and the longitudinal direction in the position distribution data on the features and as a result, detects a border between different types of features. In this case, the processor 20 sets a point on the border as a new reference point. In the case where, for example, a border between the grass and the house is detected at point Pc in FIG. 3B, the processor 20 sets point Pc as a new reference point. The processor 20 finds the transverse number and the longitudinal number of the feature block images of the house based on the lengths, in the transverse direction and the longitudinal direction, of a region occupied by the house, and aligns the feature block images by the transverse number and the longitudinal number.

In general, the region occupied by each of the features such as the grass, the road, the house and the like has a planar shape different from a rectangle. The processor 20 regards the region occupied by each feature as an assembly of a plurality of rectangular or strip-shaped regions having different sizes, and applies the above-described process for each of the regions. Thus, the processor 20 can generate map data.

The above-described process is merely an example, and the map data may be generated by another method. For example, the processor 20 may detect the width of a road around the field based on at least one of the sensor data and the image data, align the road block images in the width direction by the number corresponding to the width of the road, and thus generate map data reflecting the width of the road. In this case, features other than the road may be represented by one type of feature block images. After aligning the feature block images, the processor 20 may execute a process of smoothing the border between different types of feature block images or a process of interpolating an area of an unknown type of feature with an image of the feature existing around such an area, and thus generate map data as a final product.

Figure 4:
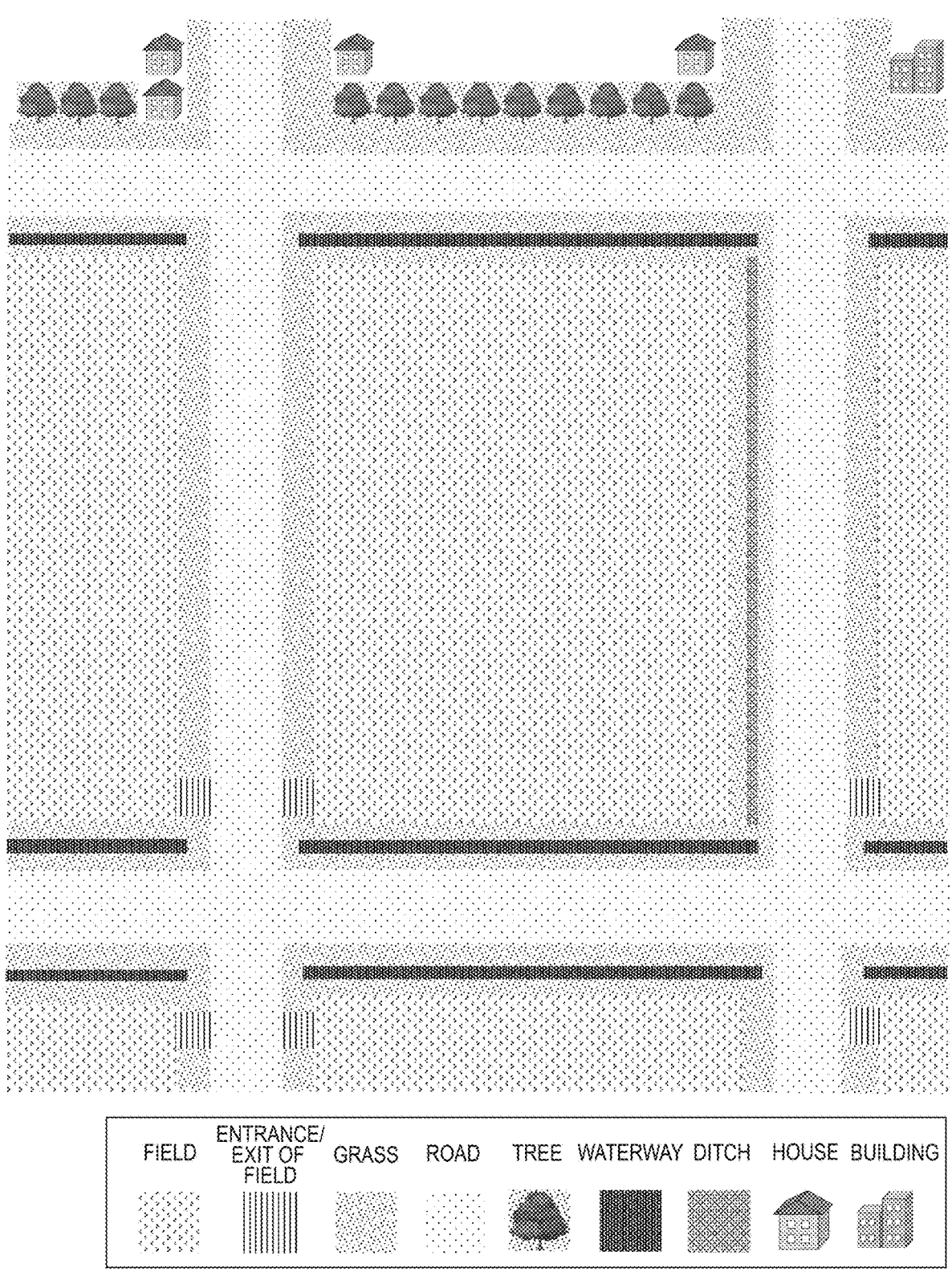
FIG. 4 is a diagram showing an example of a portion of a map generated by the processor.

FIG. 4 shows an example of a portion of the map generated in step S13. The map in this example is of the bitmap format created by aligning nine types of feature block images (pixel art images in this example) shown at the bottom of FIG. 4. The processor 20 can generate the map shown in FIG. 4 by a process of disposing each feature block image at a position corresponding thereto as represented by the position distribution data on the features. In this manner, the processor 20 can align the plurality of types of feature block images recorded in the storage 10 to generate the map data.

The processor 20 may dispose the feature block image of each feature as being enlarged or contracted to an appropriate size. For example, the feature block images representing structural bodies such as a house and a building may be disposed in a state of being relatively large, whereas the feature block images representing grass, an agricultural road, a waterway and a ditch may be disposed in a state of being relatively small. Such a process can smooth the border between the feature block images aligned and allow a map reflecting an actual state of the region better to be generated.

In the example shown in FIG. 4, a road block image associated with roads is used, and the generated map reflects the actual position and the actual width of each of the roads. As can be seen, the processor 20 may align one or more types of feature block images associated with one or more types of features and also the road block image associated with the roads, in accordance with the position distribution data on the features to generate the map data. Even in the case where the road block image is not used, the processor 20 may align the feature block images of the grass and the like existing on both of two sides of each road, and thus generate map data representing a region between these feature block images as a road.

The map shown in FIG. 4 represents the environment where the agricultural machine is to travel in a simple manner, but represents the position and the width of each of the roads around the fields correctly. Generation of such a map allows path planning for self-traveling of the agricultural machine to be performed appropriately.

Unlike general self-driving vehicles, agricultural machines performing self-driving often travel at a low speed, and travel on agricultural roads around fields more often than on general roads where pedestrians and automobiles come and go frequently. Such self-driving agricultural machines are required to travel on the agricultural roads appropriately and to go back and forth between the agricultural roads and the fields automatically and smoothly. This requires a map representing the positions and the widths of the agricultural roads around the fields correctly. However, such a map is not generally available. Maps for general self-driving vehicles are widely available, but many of such maps are not applicable to the self-driving agricultural machines. The maps for the general self-driving vehicles include detailed information on roads such as general roads and freeways but often lack in information on fields and agricultural roads. For example, in general, such maps do not include information on entrances/exits of the fields or do not correctly show the shapes of the fields or the widths of the agricultural roads adjacent to the fields. The maps for the general self-driving vehicles include much information that is not necessary for the agricultural machines (e.g., information on the roads on which the agricultural machines would not travel, such as freeways). Therefore, maps for the general vehicles are not always suitable to create or display a path for the self-driving agricultural machines.

The map generation system 1000 according to the present example embodiment can generate, by a simple process, a map correctly representing the position and the width of each of the roads around the fields and representing features other than the roads in a simple manner. Therefore, it can efficiently generate a map suitable to create or display a path along which an agricultural machine is to travel.

Now, a specific example of configuration and operation of the map generation system 1000 according to the present example embodiment will be described.

FIG. 5 is a block diagram showing another example configuration of the map generation system 1000. The map generation system 1000 in this example further includes a movable body 30 in addition to the storage 10 and the processor 20. The processor 20 in this example is configured or programmed to execute processes of recognizing the features, generating position distribution data on the features, aligning feature block images, and generating map data, based on data acquired from the movable body 30. Each of these processes may be implemented as a software module or a hardware module (e.g., a circuit).

The movable body 30 includes a LiDAR sensor 33, a camera 34, and a GNSS unit 35. While moving, the movable body 30 collects data required by the processor 20 to generate map data, by use of the LiDAR sensor 33, the camera 34 and the GNSS unit 35. The data collected by the LiDAR sensor 33, the camera 34 and the GNSS unit 35 is provided to the processor 20 via a wired or wireless network or a storage medium. The movable body 30 may be the same as, or different from, the agricultural machine using the map data generated by the processor 20. The movable body 30 is not limited to an agricultural machine such as a work vehicle, and may be an aerial vehicle such as a drone.

The LiDAR sensor 33 uses light to measure the distance to an object around the movable body 30. The LiDAR sensor 33 generates and outputs sensor data representing the distance distribution or the position distribution of objects existing around the movable body 30. The LiDAR sensor 33 may be, for example, a scanner-type sensor that acquires information on the distance distribution or the position distribution of objects in the space by scanning performed by a laser beam. Alternatively, the LiDAR sensor 33 may be a flash-type sensor that acquires information on the distance distribution or the position distribution of objects in the space by use of light diffused in a wide range.

The LiDAR sensor 33 may be configured to, for example, emit a pulse-like laser beam (i.e., a laser pulse), measure the time period required for the laser pulse reflected by an object around the movable body 30 to return to the LiDAR sensor 33, and calculate the distance to the point of reflection on a surface of the object based on the time period. Alternatively, the LiDAR sensor 33 may measure the distance by use of the FMCW (Frequency Modulated Continuous Wave) technology. A LiDAR sensor using the FMCW technology emits laser light having a frequency thereof modulated linearly, and can find the distance to the point of reflection and the speed based on the frequency of a beat signal acquired by detecting the interference light of the emitted light and the reflected light.

The LiDAR sensor 33 may be configured to output sensor data including information on the distance and the direction to each of points of reflection. Alternatively, the LiDAR sensor 33 may calculate coordinate values of each point of reflection in a coordinate system fixed to the movable body 30 (hereinafter, this coordinate system will be referred to as a "movable body coordinate system") based on the information on the distance and the direction to each point of reflection, and output sensor data including the coordinate values. The sensor data may include luminance information on each point of reflection. The luminance information on each point of reflection may be used to specify the type of the feature positioned at the point of reflection.

The LiDAR sensor 33 may be a two-dimensional LiDAR sensor or a three-dimensional LiDAR sensor. A two-dimensional LiDAR sensor may scan the environment in a state where the laser beam rotates within one plane. By contrast, a three-dimensional LiDAR sensor may scan the environment in a state where a plurality of laser beams rotate along different conical surfaces respectively. Data necessary to generate a three-dimensional map may be collected by use of the three-dimensional LiDAR sensor.

The coordinate values (two-dimensional or three-dimensional coordinate values) of each point of reflection that are calculated based on the information on the distance and the direction generated by the LiDAR sensor 33 are expressed in the movable body coordinate system. The processor 20 converts the coordinate values of each point of reflection in the movable body coordinate system into those in the world coordinate system fixed to the globe, and thus can acquire the coordinate values of each point of reflection in the world coordinate system. As a result, two-dimensional or three-dimensional point cloud data can be generated. In order to convert the coordinate values in the movable body coordinate system into those in the world coordinate system, information on a pose (i.e., the position and the orientation) of the movable body 30 is required. The pose of the movable body 30 may be determined based on GNSS data output from the GNSS unit 35.

The camera 34 is an imager that images the environment around the movable body 30 to generate image data. The camera 34 may include, for example, an image sensor acquiring a visible light image or an infrared image, and a lens optical system forming an image at the image sensor. The camera 34 generates data on a moving image of a predetermined frame rate. The image data output from the camera 34 may be used to recognize objects existing in the space.

The GNSS unit 35 includes a GNSS receiver, and generates GNSS data including positional information on the movable body 30. The GNSS receiver may include an antenna receiving signals from GNSS satellites and a processor calculating the position of the movable body 30 based on the signals received by the antenna. The GNSS unit 35 receives satellite signals transmitted from a plurality of GNSS satellites and performs positioning based on the satellite signals. GNSS is the general term for satellite positioning systems such as GPS (Global Positioning System), QZSS (Quasi-Zenith Satellite System; e.g., MICHIBIKI), GLONASS, Galileo, and BeiDou.

The GNSS unit 35 may include an inertial measurement unit (IMU). The IMU may include, for example, a direction sensor such as a 3-axis accelerometer, a 3-axis gyroscope or a 3-axis geomagnetic sensor. The IMU measures a tilt, a small motion and an orientation of the movable body 30. The GNSS unit 35 complements the position data based on the satellite signals by use of the data acquired by the IMU, and thus can estimate the position and the orientation of the movable body 30 at a high accuracy. The IMU may be provided independently from the GNSS unit 35.

Figure 6:
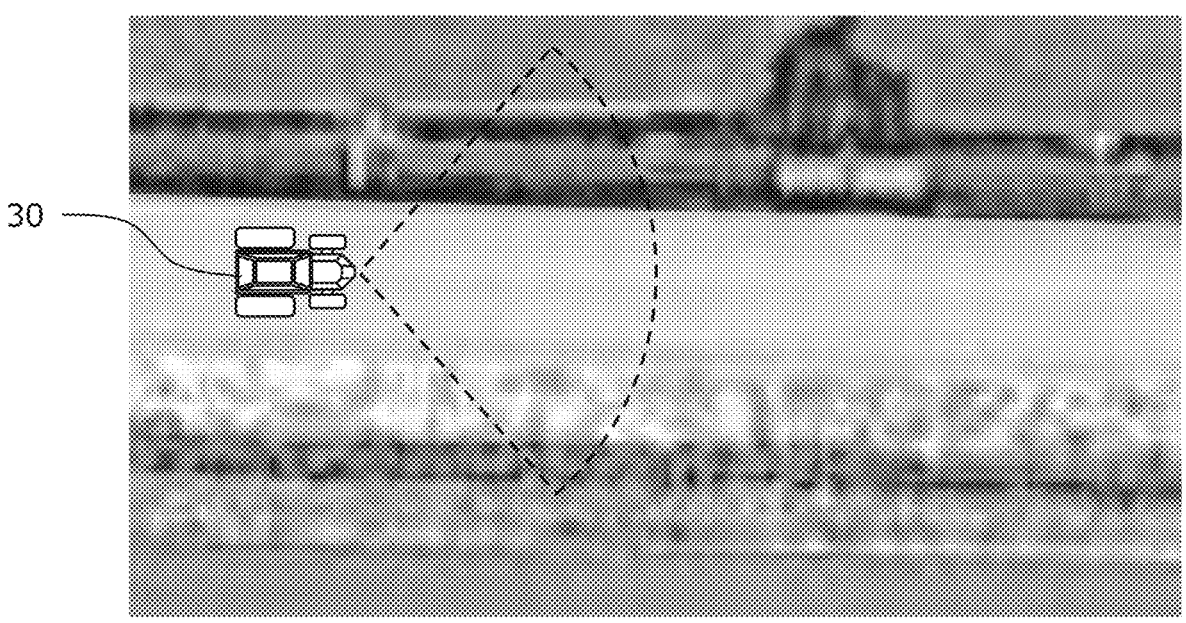
FIG. 6 schematically shows a movable body performing sensing while traveling on an agricultural road around a field.

FIG. 6 schematically shows the movable body 30 performing sensing by use of the LiDAR sensor 33 and the camera 34 while traveling on an agricultural road around a field. The movable body 30 in this example is a work vehicle of the same type as that of the agricultural machine using the map data (e.g., a tractor). The movable body 30 may be another type of movable body such as, for example, a drone. In FIG. 6, the fan shape defined by the dashed line schematically shows an example of range of sensing performed by use of the LiDAR sensor 33 or the camera 34. The movable body 30 may be moved by driving or remote operation performed by the driver (operator). Alternatively, the movable body 30 may automatically move while performing localization and map generation at the same time based on the sensor data from the LiDAR sensor 33 by use of an algorithm such as SLAM (Simultaneous Localization and Mapping).

While the movable body 30 is moving, the LiDAR sensor 33 measures the distance to each of features existing around the movable body 30, whereas the camera 34 images the surrounding environment of the movable body 30. The GNSS unit 35 repeatedly measures the position and the orientation of the movable body 30. While moving, the movable body 30 accumulates the sensor data output from the LiDAR sensor 33, the image data output from the camera 34 and the GNSS data output from the GNSS unit 35 in the storage included in the movable body 30, with such data being associated with, for example, information on the date and time. The sensor data, the image data and the GNSS data thus accumulated are transmitted to the processor 20 at a certain timing and used to generate the map data.

The processor 20 in this example generates the map data based on the sensor data, the image data and the GNSS data. More specifically, the processor 20 performs the operation shown in FIG. 3A to generate the map data. In step S11 shown in FIG. 3A, the processor 20 generates the position distribution data on the features based on the sensor data, the image data and the GNSS data.

Figure 7:
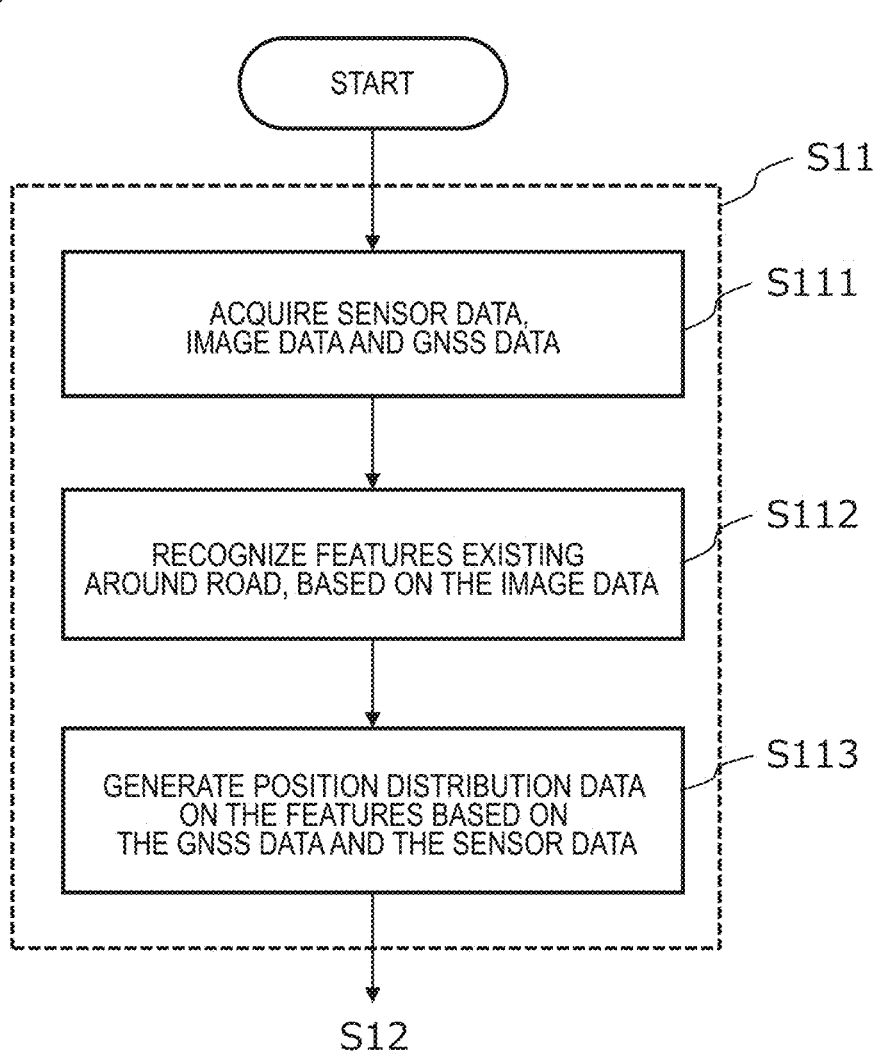
FIG. 7 is a flowchart showing an example of process of generating the position distribution data on the features.

FIG. 7 is a flowchart showing an example of process, executed by the processor 20, of generating the position distribution data on the features. The processor 20 in this example executes processes of steps S111, S112 and S113 in step S11 shown in FIG. 3A. Hereinafter, the process of each step will be described.

Step S111

The processor 20 acquires the sensor data, the image data and the GNSS data collected by the movable body 30 during the movement of the movable body 30 on the road around the field.

Step S112

The processor 20 recognizes one or more types of features existing around the road based on the acquired image data. The processor 20 recognizes, for example, features including at least one type among grass, tree, ditch, waterway, field and building existing around the road based on the image data. The processor 20 can recognize one or more types of features existing around the road by executing a process of pattern matching, segmentation or the like based on the image data. For recognition of the features, image recognition by machine learning may be used. For example, the processor 20 may recognize the features in the image by semantic segmentation using the convolutional neural network (CNN). The image recognition is not limited to using any specific algorithm, and may use any algorithm. The processor 20 may detect a border between the road and another feature or detect the width of the road by image recognition. The processor 20 may use information on the border between the road and the another feature and/or information on the width of the road for the process of aligning the feature block images in step S13 to be executed later.

Step S113

The processor 20 generates position distribution data on the features recognized in step S112, based on the GNSS data and the sensor data. The processor 20, for example, calculates the position coordinate values (e.g., the latitude and the longitude) of each of points of reflection in the geographic coordinate system, based on the distance and the direction to each point of reflection represented by the sensor data and also the distance and the orientation of the movable body 30 represented by the GNSS data. At this point, the processor 20 may calculate three-dimensional position coordinate values including information on the altitude of each point of reflection. As a result, the processor 20 can generate two-dimensional or three-dimensional point cloud data representing the objects existing in the surrounding environment of the movable body 30. The processor 20 performs matching of the image data and the point cloud data to specify a range for the position of a point corresponding to each feature recognized in step S112. For example, the processor 20 may generate, as the position distribution data on the feature, data showing an identifier representing the type of each recognized feature and also showing the range for the position coordinate values of the corresponding point. In this manner, the processor 20 can generate position distribution data representing the distribution of the positions (e.g., the latitude and the longitude) of one or more types of features, based on the GNSS data and the sensor data.

As a result of the above-described processes, the processor 20 can generate the position distribution data on the features recognized based on the image data. After step S113, the processor 20 executes the processes of steps S12 and S13 shown in FIG. 3A to generate the map data.

In step S13, the processor 20 aligns one or more types of feature block images associated with the one or more types of features recognized in step S112, in the region where the features exist on the map data in accordance with the position distribution data, and thus generates the map data. The processor 20 aligns the feature block images such that, for example, the width of the road recognized in step S112 is correctly reflected. As a result, a map suitable to the path planning for the agricultural machine can be generated. The processor 20 may generate the map without using the road block image representing the road. For example, the processor 20 may generate a map by aligning one or more types of feature block images other than the road block image along, and outward of, the border between the road and a feature other than the road, and disposing an image representing the road (e.g., an image of a specific color or pattern) inward of the border.

In the above-described example, the movable body 30 includes both of the LiDAR sensor 33 and the camera 34 (i.e., the imager). The movable body 30 may include only either the LiDAR sensor 33 or the camera 34. Even in this case, the processor 20 can detect and recognize the features based on the data output from the LiDAR sensor 33 or the camera 34 to generate the position distribution data on the features. For example, the processor 20 can generate position distribution data representing the distribution of the road and the features other than the road, based on information representing the distance to, or the position of, each of the points of reflection and also the luminance information on each point of reflection, both information being included in the sensor data output from the LiDAR sensor 33. The light reflectance is different among the features, and therefore, the features can be distinguished from each other based on the luminance information on the point of reflection. Alternatively, an imager that can acquire distance information such as a ToF (Time of Flight) camera or a stereo camera can be used to provide the same results as in the case where the LiDAR sensor 33 is used. The movable body 30 may perform positioning or localization by another method, instead of using the GNSS unit 35. For example, the movable body 30 may automatically move while performing localization and map generation at the same time based on the sensor data by use of an algorithm such as SLAM. In this case, the processor 20 may execute the process of recognizing the features and the process of aligning the feature block images described above, based on the map generated by the movable body 30 (e.g., a point cloud map), to generate map data as a final product.

After generating the map data by the above-described method, the processor 20 may generate a path for self-traveling of the agricultural machine along the road, based on the map data. The path may be generated by a device different from the processor 20 (e.g., a computer mounted on the agricultural machine or a server computer on the cloud). The agricultural machine performs self-traveling along the generated path (hereinafter, may be referred to as a "target path" or a "global path"). The processor 20 may display the generated map or path on a display screen of the terminal device used by the user.

Now, an example embodiment of a system to manage an agricultural machine performing self-driving based on the map data created by the above-described method will be described. Hereinafter, example embodiments in which techniques according to the present disclosure are applied to a work vehicle, such as a tractor, which is an example of agricultural machine, will be mainly described. The techniques according to the present disclosure are also applicable to other types of agricultural machines in addition to the work vehicle such as a tractor.

Figure 8:
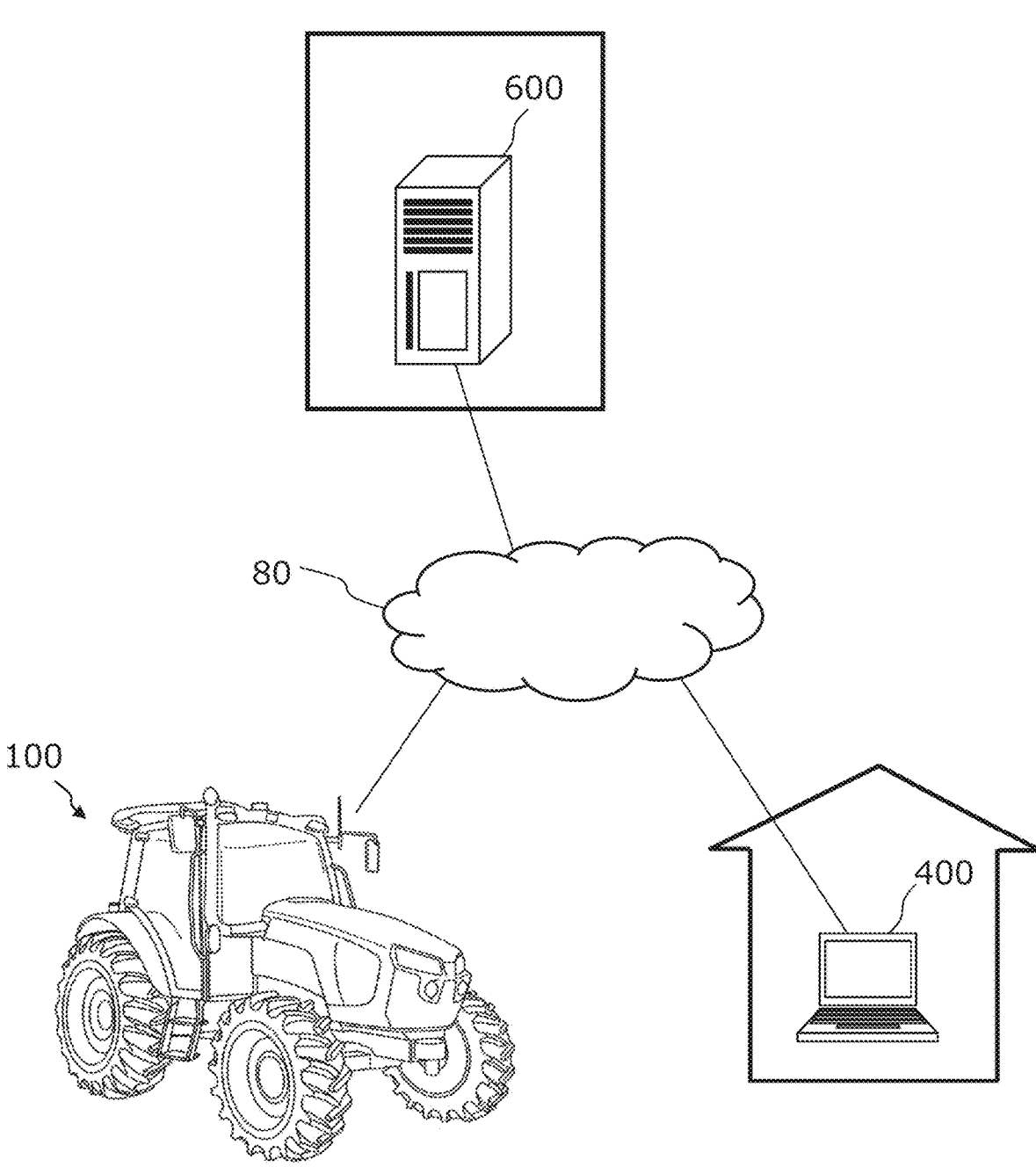
FIG. 8 is a diagram providing an overview of an agriculture management system according to an illustrative example embodiment of the present disclosure.

FIG. 8 is a diagram providing an overview of an agriculture management system according to an illustrative example embodiment of the present disclosure. The agriculture management system shown in FIG. 8 includes a work vehicle 100, a terminal device 400, and a management device 600. The terminal device 400 is a computer used by a user performing remote monitoring of the work vehicle 100. The management device 600 is a computer managed by a business operator running the agriculture management system. The work vehicle 100, the terminal device 400 and the management device 600 can communicate with each other via the network 80. FIG. 8 shows one work vehicle 100, but the agriculture management system may include a plurality of the work vehicles or any other agricultural machine.

The work vehicle 100 according to the present example embodiment is a tractor. The work vehicle 100 can have an implement attached to its rear and/or its front. While performing agricultural work in accordance with a particular type of implement, the work vehicle 100 is able to travel inside a field. The work vehicle 100 may travel inside the field or outside the field with no implement being attached thereto.

The work vehicle 100 has a self-driving function. In other words, the work vehicle 100 can travel by the action of a controller, rather than manually. The controller according to the present example embodiment is provided inside the work vehicle 100, and is able to control both the speed and steering of the work vehicle 100. The work vehicle 100 can perform self-traveling outside the field (e.g., on roads) as well as inside the field.

The work vehicle 100 includes a device usable for positioning or localization, such as a GNSS receiver or an LiDAR sensor. Based on the position of the work vehicle 100 and information on a target path, the controller of the work vehicle 100 causes the work vehicle 100 to automatically travel. In addition to controlling the travel of the work vehicle 100, the controller also controls the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). In the case of performing self-traveling on a road outside the field, the work vehicle 100 travels while generating, along the target path, a local path along which the work vehicle 100 can avoid an obstacle, based on data output from a sensing device such as a camera or the LiDAR sensor. Inside the field, the work vehicle 100 may travel while generating a local path in substantially the same manner as described above, or may perform an operation of traveling along the target path without generating a local path and halting when an obstacle is detected.

The management device 600 is a computer to manage the agricultural work performed by the work vehicle 100. The management device 600 may be, for example, a server computer that performs centralized management on information regarding the field on the cloud and supports agriculture by use of the data on the cloud. The management device 600, for example, creates a map of an environment where the work vehicle 100 is to travel and a work plan for the work vehicle 100, and performs global path planning for the work vehicle 100 in accordance with the map and the work plan. The management device 600 generates a map of the environment where the work vehicle 100 is to travel by substantially the same method as described above with reference to FIG. 1 to FIG. 7. That is, the management device 600 recognizes one or more types of features existing in the environment, based on the data collected by the work vehicle 100 or another movable body by use of at least one of the LiDAR sensor and an imager, and aligns feature block images corresponding to the recognized features to generate an environment map. The management device 600 generates a global path (target path) for the work vehicle 100 based on the generated environment map. In the present example embodiment, the management device 600 is configured or programmed to function as a map generation system generating map data for self-driving of the agricultural machine.

The management device 600 generates a target path inside the field and a target path outside the field by different methods from each other. The management device 600 generates a target path inside the field based on information regarding the field. For example, the management device 600 can generate a target path inside the field based on various types of previously registered information such as the outer shape of the field, the area size of the field, the position of the entrance/exit of the field, the width of the work vehicle 100, the width of the implement, the contents of the work, the types of crops to be grown, the region where the crops are to be grown, the growing states of the crops, and the interval between rows or ridges of the crops. The management device 600 generates a target path inside the field based on, for example, information input by the user by use of the terminal device 400 or any other device. The management device 600 generates a target path inside the field such that the path covers, for example, the entirety of a work area where the work is to be performed. Meanwhile, the management device 600 generates a path outside the field in accordance with the work plan or the user's instructions. For example, the management device 600 can generate a target path outside the field based on various types of information such as the order of tasks of agricultural work indicated by the work plan, the position of the field where each task of agricultural work is to be performed, the position of the entrance/exit of the field, the time when each task of agricultural work is to begin and/or end, the state of the road surface, the state of weather or the traffic state. The management device 600 may generate a target path based on information representing the path or the waypoints specified by the user manipulating the terminal device 400, without relying on the work plan. The management device 600 transmits data on the work plan, the target path and the environment map thus generated to the work vehicle 100. The work vehicle 100 automatically moves and performs agricultural work based on the data.

The global path planning and the generation (or editing) of the environment map may be performed by any other device than the management device 600. For example, the controller of the work vehicle 100 may perform global path planning, or the generation or editing of the environment map.

The terminal device 400 is a computer that is used by a user who is at a remote place from the work vehicle 100. The terminal device 400 shown in FIG. 8 is a laptop computer, but the terminal device 400 is not limited to this. The terminal device 400 may be a stationary computer such as a desktop PC (personal computer), or a mobile terminal such as a smartphone or a tablet computer. The terminal device 400 may be used to perform remote monitoring of the work vehicle 100 or remote-manipulate the work vehicle 100. For example, the terminal device 400 can display, on a display screen thereof, a video captured by one or more cameras (imagers) included in the work vehicle 100. The user can watch the video to check the state of the surroundings of the work vehicle 100 and instruct the work vehicle 100 to halt or begin traveling. The terminal device 400 can also display, on the display screen thereof, a setting screen allowing the user to input information necessary to create a work plan (e.g., a schedule of each task of agricultural work) for the work vehicle 100. When the user inputs necessary information to the setting screen and performs a manipulation to transmit the information, the terminal device 400 transmits the input information to the management device 600. The management device 600 creates a work plan based on the information. The terminal device 400 may also be used to register one or more fields where the work vehicle 100 is to perform the agricultural work. The terminal device 400 may further have a function of displaying, on a display screen thereof, a setting screen allowing the user to input information necessary to set a target path. The terminal device 400 may display the map generated by the management device 600 (e.g., the map shown in FIG. 4) on the setting screen. The user may perform a manipulation of setting a target path on the displayed map.

Hereinafter, a configuration and an operation of the system according to the present example embodiment will be described in more detail.

Figure 9:
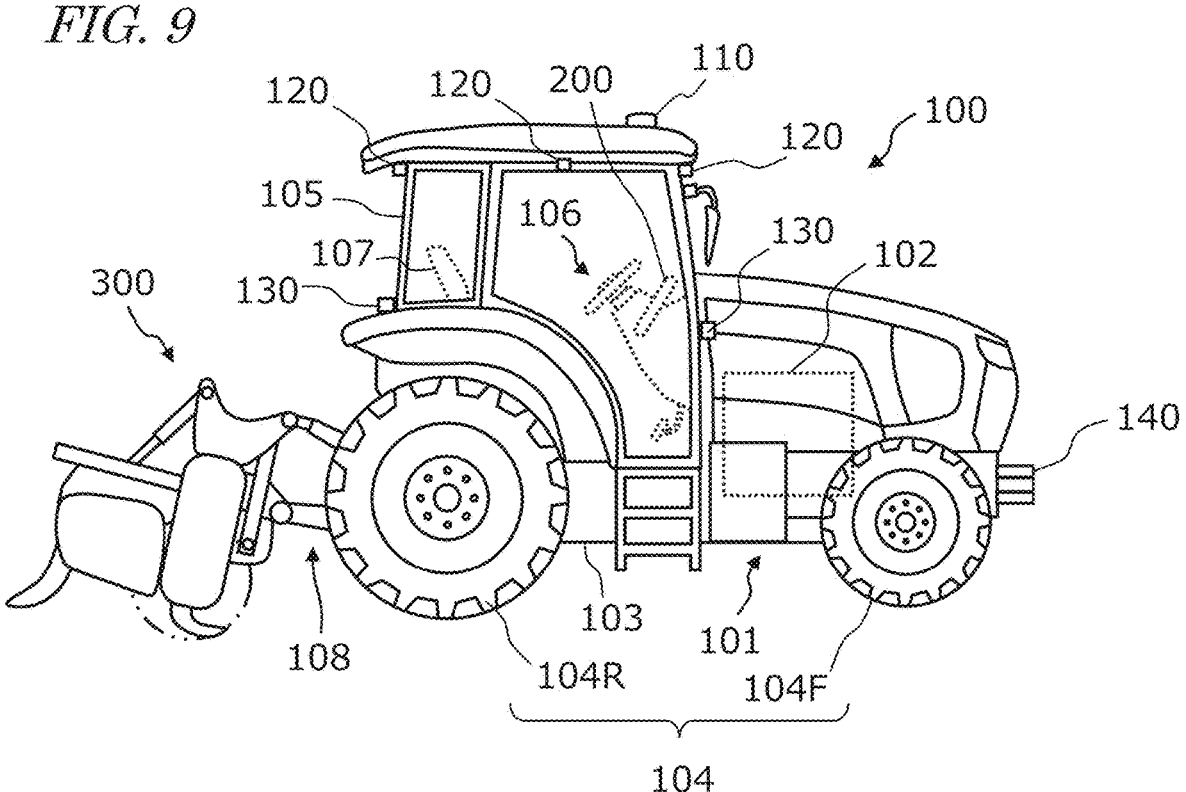
FIG. 9 is a side view schematically showing an example of work vehicle and an example of implement that is linked to the work vehicle.

FIG. 9 is a side view schematically showing an example of the work vehicle 100 and an example of implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 can perform self-driving both inside a field and outside the field.

As shown in FIG. 9, the work vehicle 100 includes a vehicle body 101, a prime mover (engine) 102, and a transmission 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, the front wheels 104F and/or the rear wheels 104R may have crawlers, rather than tires, attached thereto.

The work vehicle 100 includes a plurality of sensing devices sensing the surroundings of the work vehicle 100. In the example shown in FIG. 9, the sensing devices include a plurality of cameras 120, a LiDAR sensor 140, and a plurality of obstacle sensors 130.

The cameras 120 may be provided at the front/rear/right/ left of the work vehicle 100, for example. The cameras 120 image the surrounding environment of the work vehicle 100 and generate image data. The images acquired by the cameras 120 may be transmitted to the terminal device 400, which is responsible for remote monitoring. The images may be used to monitor the work vehicle 100 during unmanned driving. The cameras 120 may also be used to generate images to allow the work vehicle 100, traveling on a road outside the field (an agricultural road or a general road), to recognize features, obstacles, white lines, road signs, traffic signs or the like in the surroundings of the work vehicle 100.

The LiDAR sensor 140 in the example shown in FIG. 9 is disposed on a bottom portion of a front surface of the vehicle body 101. The LiDAR sensor 140 may be disposed at any other position. While the work vehicle 100 is traveling mainly outside the field, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data output from the LiDAR sensor 140 is processed by the controller of the work vehicle 100. The controller can perform localization of the work vehicle 100 by matching the sensor data against the environment map. The controller can further detect an object such as an obstacle existing in the surroundings of the work vehicle 100 based on the sensor data, and generate, along the global path, a local path along which the work vehicle 100 needs to actually proceed. The controller can utilize an algorithm such as, for example, SLAM to generate or edit an environment map. The work vehicle 100 may include a plurality of LiDAR sensors disposed at different positions with different orientations.

The plurality of obstacle sensors 130 shown in FIG. 9 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles in the surroundings of the work vehicle 100 during self-traveling to cause the work vehicle 100 to halt or detour around the obstacles. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

The controller of the work vehicle 100 may utilize, for positioning, the sensing data acquired by the sensing devices such as the cameras 120 or the LiDAR sensor 140, in addition to the positioning results provided by the GNSS unit 110. In the case where features serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 or the LiDAR sensor 140 and on an environment map that is previously stored in the storage. By correcting or complementing position data based on the satellite signals using the data acquired by the cameras 120 or the LiDAR sensor 140, it becomes possible to identify the position of the work vehicle 100 with a higher accuracy.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of the controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement can be connected frontward of the work vehicle 100.

Although the implement 300 shown in FIG. 9 is a rotary tiller, the implement 300 is not limited to a rotary tiller. For example, any arbitrary implement such as a seeder, a spreader, a transplanter, a mower, a rake implement, a baler, a harvester, a sprayer, or a harrow, can be connected to the work vehicle 100 for use.

The work vehicle 100 shown in FIG. 9 can be driven by human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 can travel via autonomous driving, or by remote operation by a user.

Figure 10:
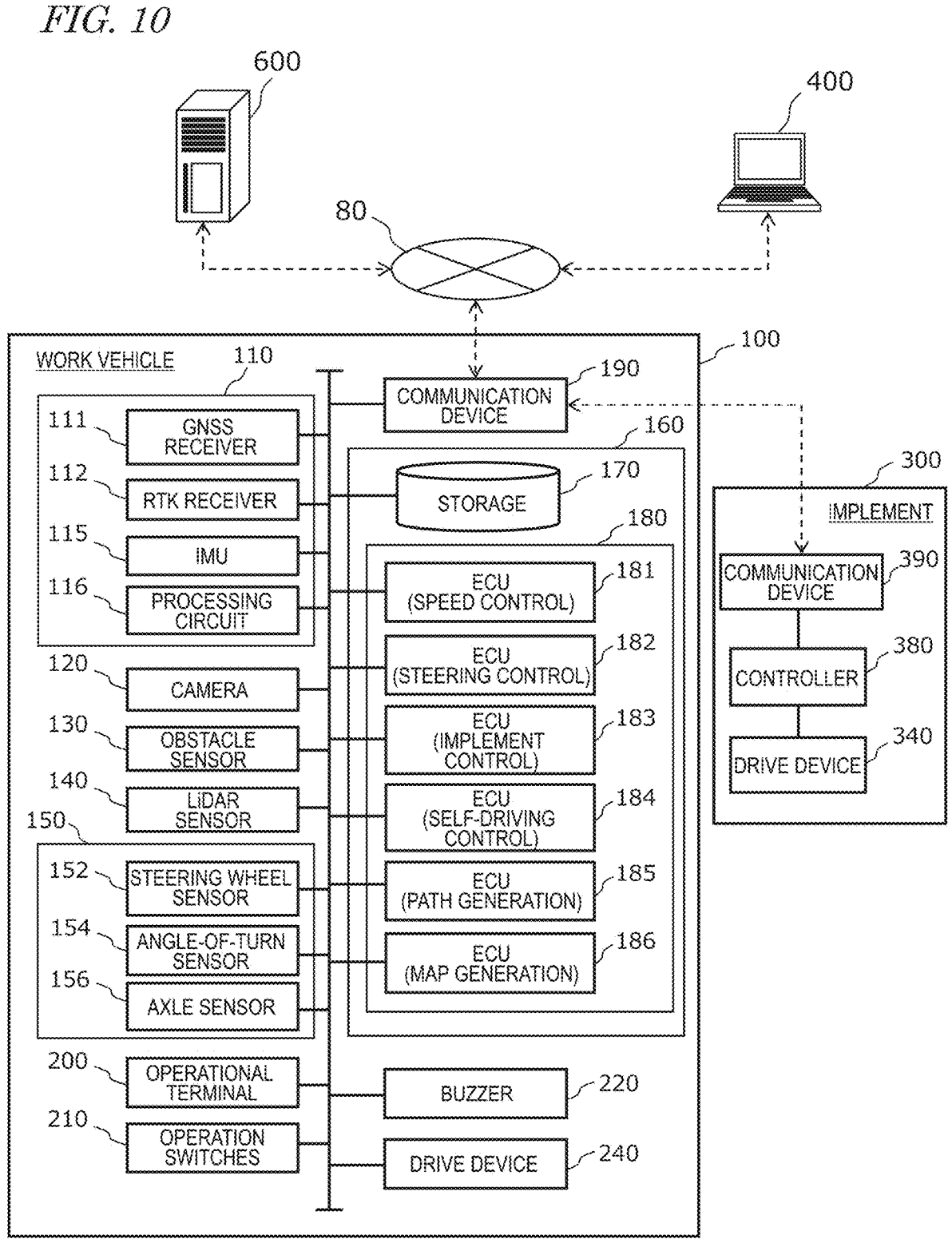
FIG. 10 is a block diagram showing an example configuration of the work vehicle and the implement.

FIG. 10 is a block diagram showing an example configuration of the work vehicle 100 and the implement 300. The work vehicle 100 and the implement 300 can communicate with each other via a communication cable that is included in the linkage device 108. The work vehicle 100 is able to communicate with the terminal device 400 and the management device 600 via the network 80.

In addition to the GNSS unit 110, the cameras 120, the obstacle sensors 130, the LiDAR sensor 140 and the operational terminal 200, the work vehicle 100 in the example of FIG. 10 includes sensors 150 to detect the operating status of the work vehicle 100, a control system 160, a communication device 190, operation switches 210, a buzzer 220, and a drive device 240. These component elements are communicably connected to each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and a axle sensor 156. The control system 160 includes a storage 170 and a controller 180. The controller 180 includes a plurality of electronic control units (ECU) 181 to 186. The implement 300 includes a drive device 340, a controller 380, and a communication device 390. Note that FIG. 10 shows component elements which are relatively closely related to the operations of self-driving by the work vehicle 100, while other components are omitted from illustration.

The GNSS receiver 111 in the GNSS unit 110 receives satellite signals transmitted from the plurality of GNSS satellites and generates GNSS data based on the satellite signals. The GNSS data is generated in a predetermined format such as, for example, the NMEA-0183 format. The GNSS data may include, for example, the identification number, the angle of elevation, the azimuth angle, and a value representing the reception strength of each of the satellites from which the satellite signals are received.

Figure 11:
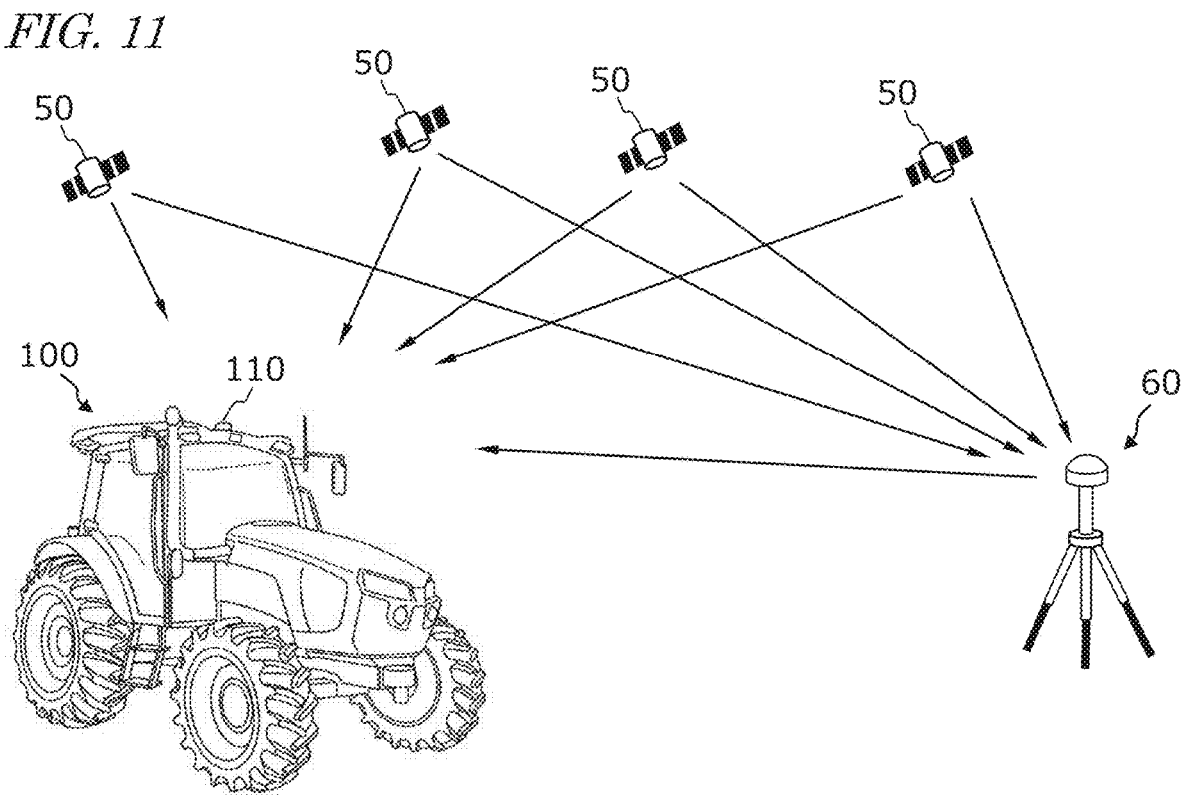
FIG. 11 is a conceptual diagram showing an example of the work vehicle performing positioning based on an RTK-GNSS.

The GNSS unit 110 shown in FIG. 10 performs positioning of the work vehicle 100 by utilizing an RTK (Real Time Kinematic)—GNSS. FIG. 11 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the work vehicle 100 performs tasked travel (e.g., at a position within about 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by use of the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., motion picture data). The cameras 120 are able to capture motion pictures at a frame rate of 3 frames/second (fps: frames per second) or greater, for example. The images generated by the cameras 120 may be used by a remote supervisor to check the surrounding environment of the work vehicle 100 with the terminal device 400, for example. The images generated by the cameras 120 may also be used for the purpose of positioning and/or detection of obstacles. As shown in FIG. 9, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects existing in the surroundings of the work vehicle 100. Each of the obstacle sensors 130 may include a laser scanner or an ultrasonic sonar, for example. When an object exists at a position within a predetermined distance from one of the obstacle sensors 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles in the surroundings of the work vehicle 100.

The steering wheel sensor 152 measures the angle of rotation of the steering wheel of the work vehicle 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of a axle that is connected to the wheels 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 may include map data on the environment where the work vehicle 100 travels (environment map) and data on a global path (target path) for self-driving. The environment map includes information on a plurality of fields where the work vehicle 100 performs agricultural work and roads around the fields. The environment map may be created by a process of aligning a plurality of types of feature block images as shown in, for example, FIG. 4. Separately from the simple environment map as shown in FIG. 4, a detailed environment map usable for localization performed by use of, for example, the LiDAR sensor 140 or the cameras 120 may be stored in the storage 170. The environment map and the target path may be generated by a processor in the management device 600. The controller 180 according to the present example embodiment may be configured or programmed to perform a function of generating or editing an environment map and a target path. The controller 180 itself may generate the environment map and the target path, or the controller 180 may edit the environment map and the target path, acquired from the management device 160, in accordance with the environment where the work vehicle 100 travels. The storage 170 also stores data on a work plan received by the communication device 190 from the management device 600. The work plan includes information on a plurality of tasks of agricultural work to be performed by the work vehicle 100 over a plurality of working days. The work plan may be, for example, data on a work schedule including information on the time when the work vehicle 100 is scheduled to perform each task of agricultural work on each of the working days. The storage 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 includes the plurality of ECUs. The plurality of ECUs include, for example, the ECU 181 for speed control, the ECU 182 for steering control, the ECU 183 for implement control, the ECU 184 for self-driving control, the ECU 185 for path generation, and the ECU 186 for map generation.

The ECU 181 controls the prime mover 102, the transmission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control for achieving self-driving. For example, the ECU 184 specifies the position of the work vehicle 100 based on the data output from at least one of the GNSS unit 110, the cameras 120 and the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired by the cameras 120 or the LiDAR sensor 140. Use of the data acquired by the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path or a local path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 controls the steering device 106 to change the steering angle.

While the work vehicle 100 is traveling along the target path, the ECU 185 consecutively generates a local path along which the work vehicle 100 can avoid an obstacle. During travel of the work vehicle 100, the ECU 185 recognizes an obstacle existing in the surroundings of the work vehicle 100 based on the data output from the cameras 120, the obstacle sensors 130 and the LiDAR sensor 140. The ECU 185 generates a local path such that the work vehicle 100 avoids the recognized obstacle. The ECU 185 may have a function of performing global path planning instead of the management device 160. In this case, the ECU 185 determines a destination of the work vehicle 100 based on the work plan stored in the storage 170, and determines a target path from a beginning point to a target point of the movement of the work vehicle 100. For example, the ECU 185 can generate, as the target path, a path by which the work vehicle 100 can arrive at the destination within the shortest time period, based on the environment map stored in the storage 170 and including information on the roads around the fields.

The ECU 186 generates or edits a map of the environment where the work vehicle 100 travels. In the present example embodiment, an environment map generated by an external device such as the management device 600 is transmitted to the work vehicle 100 and recorded in the storage 170. Instead, the ECU 186 can generate or edit an environment map. Hereinafter, an operation in a case where the ECU 186 generates an environment map will be described. An environment map may be generated based on sensor data output from the LiDAR sensor 140. For generating an environment map, the ECU 186 consecutively generates three-dimensional point cloud data based on the sensor data output from the LiDAR sensor 140 while the work vehicle 100 is traveling. The ECU 186 can generate an environment map by connecting the point cloud data consecutively generated by use of an algorithm such as, for example, SLAM. The environment map generated in this manner is a highly accurate three-dimensional map, and may be used for localization performed by the ECU 184. Based on this three-dimensional map, a two-dimensional map (e.g., the map of the bitmap format as shown in FIG. 4) usable for the global path planning may be generated. In this specification, the three-dimensional map that is used for the localization and the two-dimensional map that is used for the global path planning will be both referred to as an "environment map". The ECU 186 may further edit the map by adding, to the map, various types of attribute information on a structural body, the state of the road surface, how easily the road is passable, or the like that is recognized based on the data output from the cameras 120 or the LiDAR sensor 140.

Through the actions of these ECUs, the controller 180 realizes self-driving. During self-driving, the controller 180 controls the drive device 240 based on the measured or estimated position of the work vehicle 100 and on the target path. As a result, the controller 180 can cause the work vehicle 100 to travel along the target path.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 10, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

Figure 12:
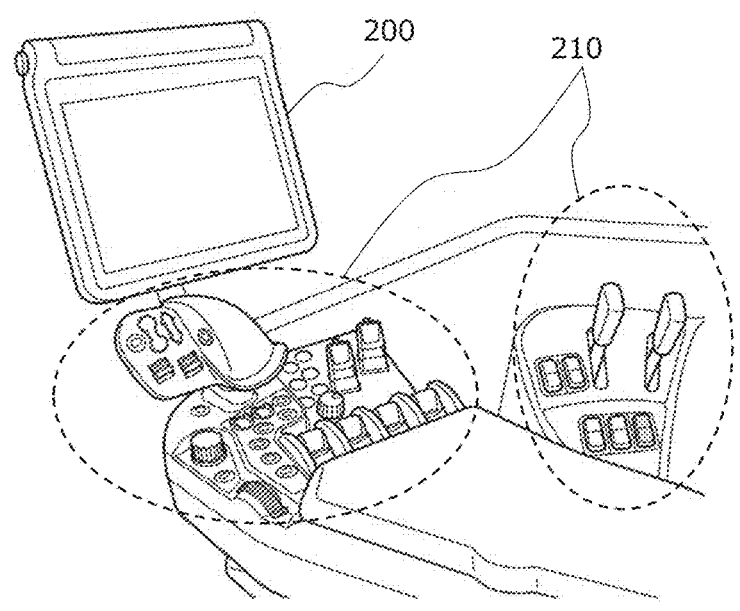
FIG. 12 is a diagram showing an example of operational terminal and an example of operation switches disposed in a cabin.

FIG. 12 is a diagram showing an example of the operational terminal 200 and an example of the operation switches 210 both provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The drive device 340 in the implement 300 shown in FIG. 10 performs operations necessary for the implement 300 to perform predetermined work. The drive device 340 includes a device suitable to uses of the implement 300, for example, a hydraulic device, an electric motor, a pump or the like. The controller 380 controls the operation of the drive device 340. In response to a signal that is transmitted from the work vehicle 100 via the communication device 390, the controller 380 causes the drive device 340 to perform various operations. Moreover, a signal that is in accordance with the state of the implement 300 can be transmitted from the communication device 390 to the work vehicle 100.

Figure 13:
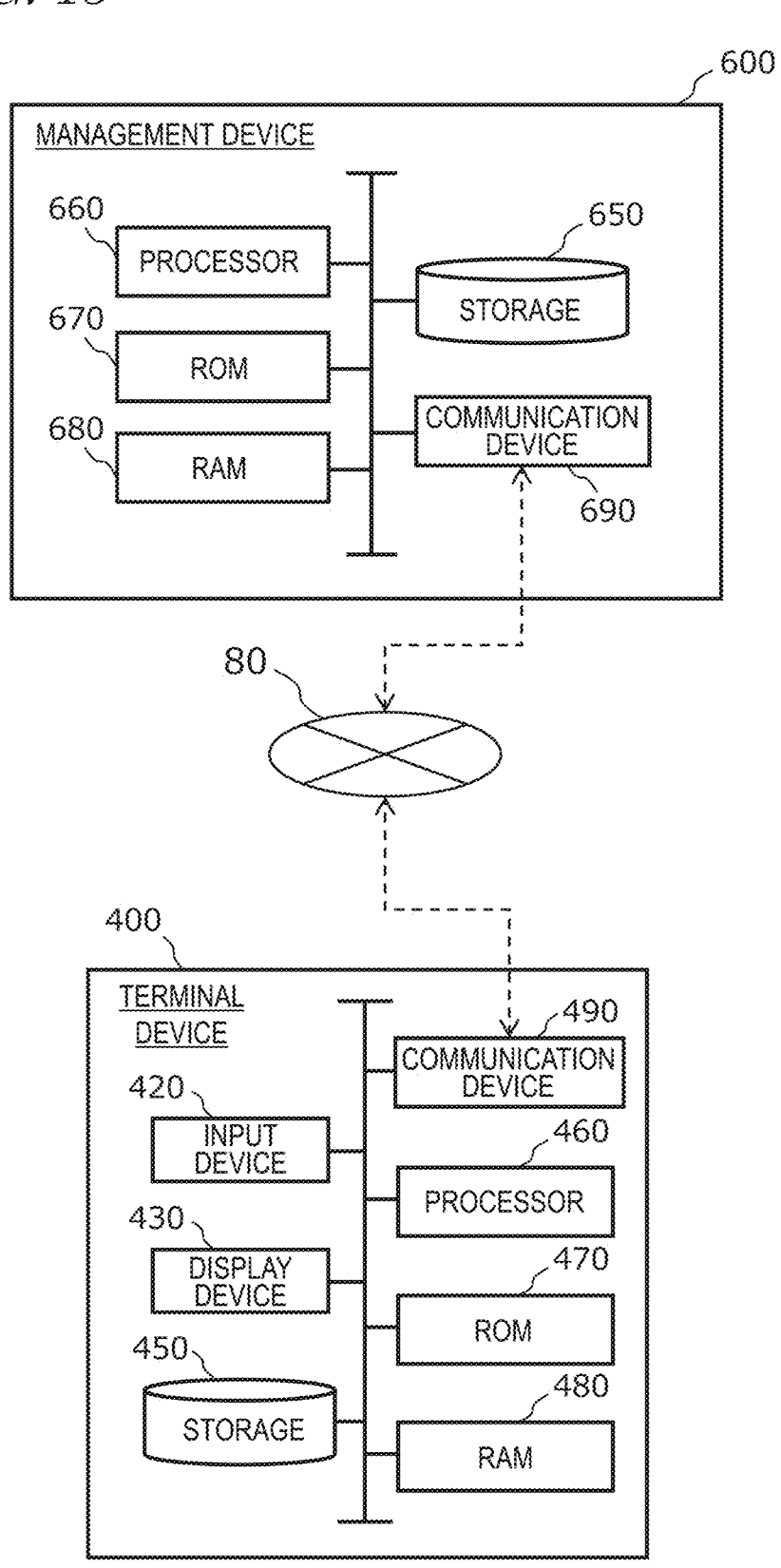
FIG. 13 is a block diagram showing an example of hardware configuration of a management device and a terminal device.

Now, a configuration of the management device 600 and the terminal device 400 will be described with reference to FIG. 13. FIG. 13 is a block diagram showing an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information to the management device 600 via the network 80. The management device 600 can create a schedule of agricultural work, that is, a work plan based on the information. The management device 600 can further generate or edit an environment map and perform global path planning for the work vehicle 100.

The communication device 690 is a communication module to communicate with the work vehicle 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may be, for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly functions as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be a device independent from the management device 600. For example, the storage 650 may be a storage connected to the management device 600 via the network 80, for example, a cloud storage.

The terminal device 400 includes an input device 420, a display device 430, a storage 450, a processor 460, a ROM 470, a RAM 480, and a communication device 490. These component elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as the corresponding component elements described above regarding the example of the hardware configuration of the management device 600, and will not be described again.

Now, an operation of the work vehicle 100, the terminal device 400 and the management device 600 will be described.

First, an example operation of self-traveling of the work vehicle 100 will be described. The work vehicle 100 according to the present example embodiment can automatically travel both inside and outside a field. Inside the field, the work vehicle 100 drives the implement 300 to perform predetermined agricultural work while traveling along a preset target path. When detecting an obstacle by the obstacle sensors 130 thereof while traveling inside the field, the work vehicle 100 halts traveling and performs operations of presenting an alarm sound from the buzzer 220, transmitting an alert signal to the terminal device 400 and the like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. The processor 660 of the management device 600 generates the map as shown in FIG. 4 as an example, by a process of aligning one or more types of feature block images, and sets a target path on a road on the map. While traveling outside the field, the work vehicle 100 performs local path planning based on data acquired by the cameras 120 or the LiDAR 140. When an obstacle is detected outside the field, the work vehicle 100 avoids the obstacle or halts at the point. Outside the field, the position of the work vehicle 100 is estimated based on data output from the LiDAR sensor 140 or the cameras 120 in addition to positioning data output from the GNSS unit 110.

Hereinafter, an operation of the work vehicle 100 performing self-traveling inside the field will be described. An operation of the work vehicle 100 performing self-traveling outside the field and a process of global path planning and local path planning outside the field will be described later.

Figure 14:
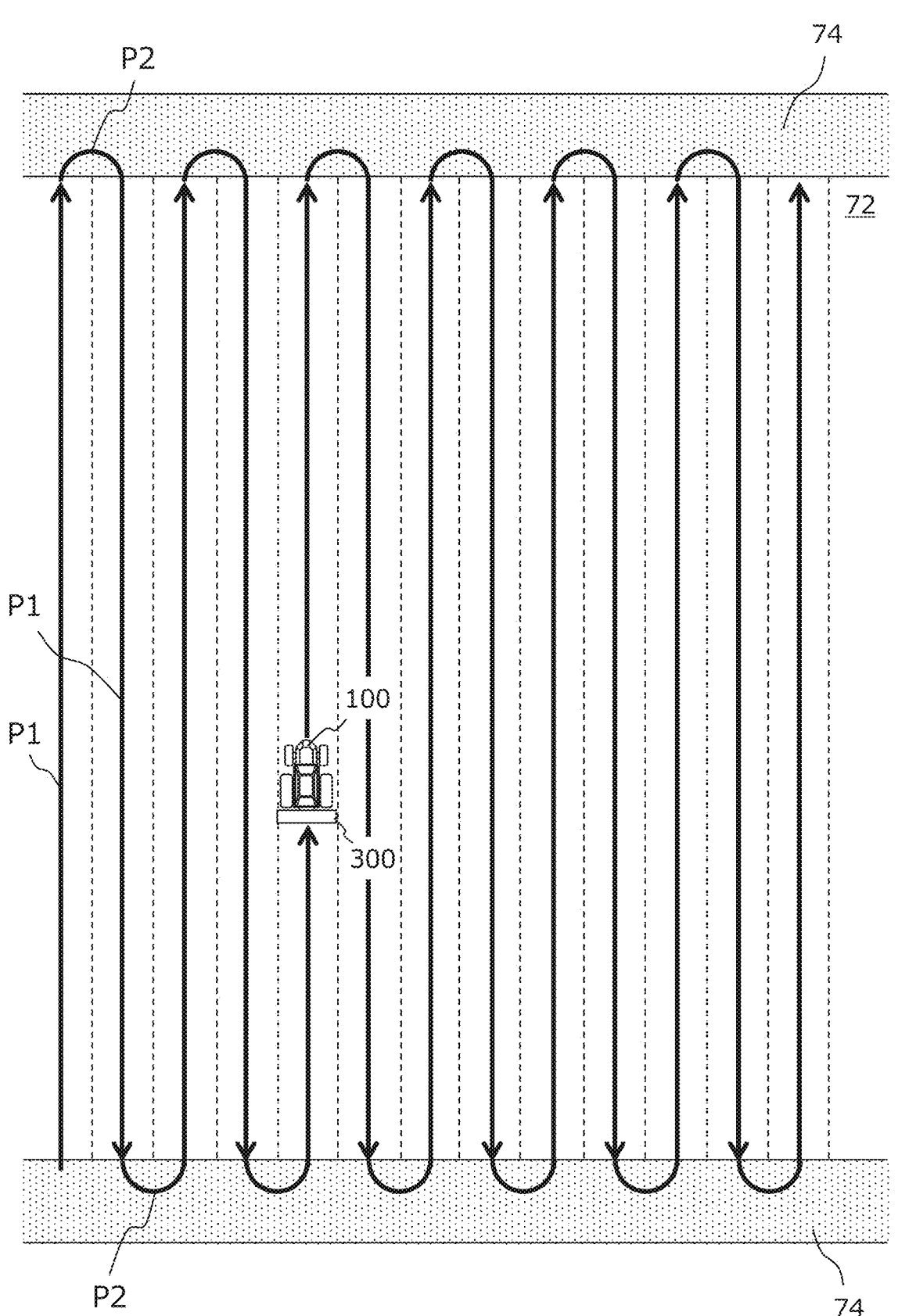
FIG. 14 is a diagram schematically showing an example of the work vehicle automatically traveling along a target path inside a field.

FIG. 14 is a diagram schematically showing an example of the work vehicle 100 automatically traveling along a target path in a field. In this example, the field includes a work area 72, in which the work vehicle 100 performs work by using the implement 300, and headlands 74, which are located near outer edges of the field. The user may previously specify which regions of the field on the map would correspond to the work area 72 and the headlands 74. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 14 is illustrated as a linear path, each main path P1 may also include a curved portion(s). Broken lines in FIG. 14 depict the working breadth of the implement 300. The working breadth is previously set and recorded in the storage 170. The working breadth may be set and recorded by the user manipulating the operational terminal 200 or the terminal device 400. Alternatively, the working breadth may be automatically recognized and recorded when the implement 300 is connected to the work vehicle 100. The interval between the plurality of main paths P1 may be set so as to be matched to the working breadth. The target path may be generated based on the manipulation made by the user, before self-driving is begun. The target path may be generated so as to cover the entire work area 72 in the field, for example. Along the target path shown in FIG. 14, the work vehicle 100 automatically travels while repeating a reciprocating motion from a beginning point of work to an ending point of work. Note that the target path shown in FIG. 14 is merely an example, and the target path may be arbitrarily determined.

Now, an example control by the controller 180 during self-driving inside the field will be described.

Figure 15:
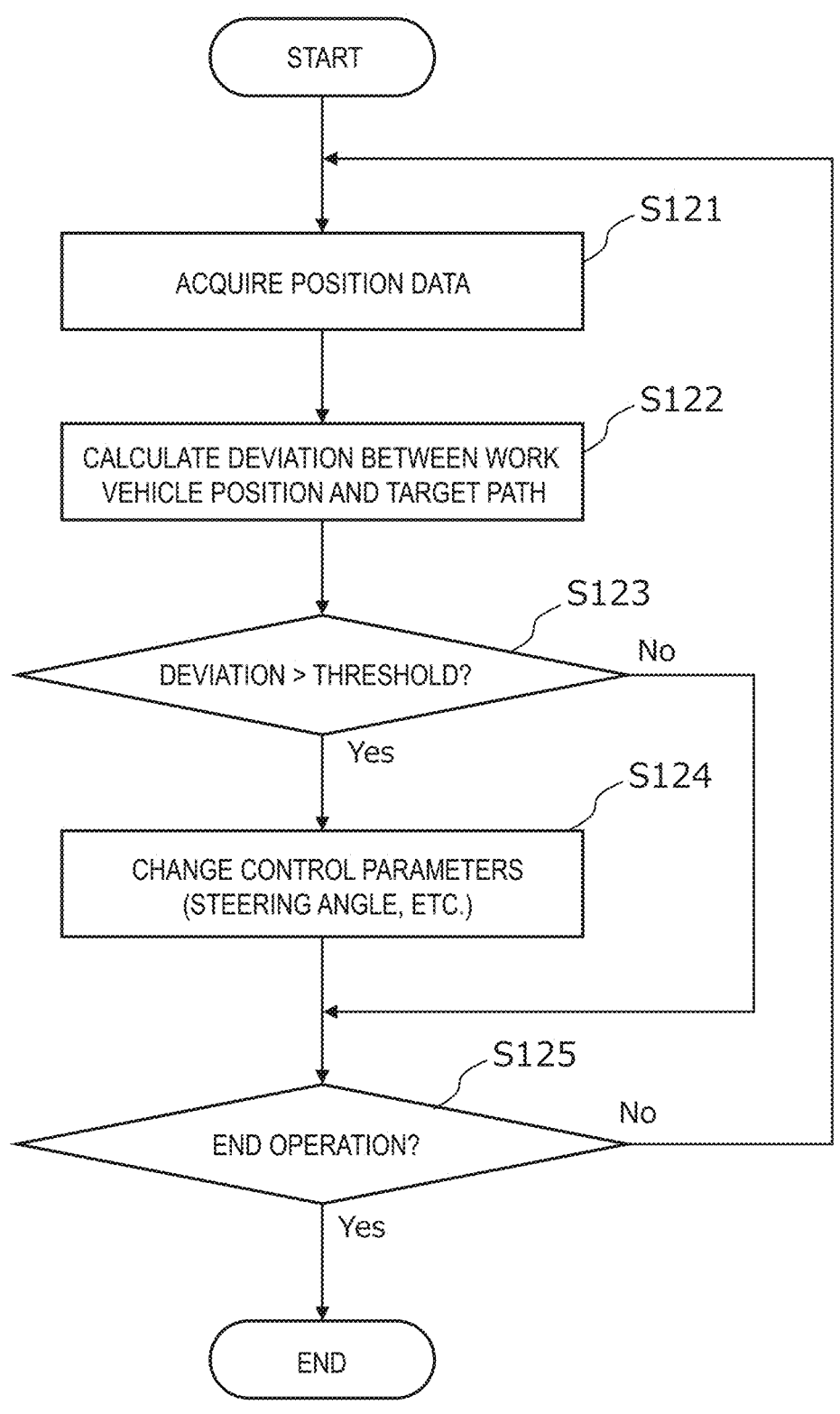
FIG. 15 is a flowchart showing an example operation of steering control during self-driving.

FIG. 15 is a flowchart showing an example operation of steering control to be performed by the controller 180 during self-driving. During travel of the work vehicle 100, the controller 180 performs automatic steering by performing the operation from steps S121 to S125 shown in FIG. 15. The speed of the work vehicle 100 will be maintained at a previously-set speed, for example. First, during travel of the work vehicle 100, the controller 180 acquires data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 15, the controller 180 controls the drive device 240 based only on the deviation between the position of the work vehicle 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 16A to 16D, an example of steering control by the controller 180 will be described more specifically.

Figure 16A:
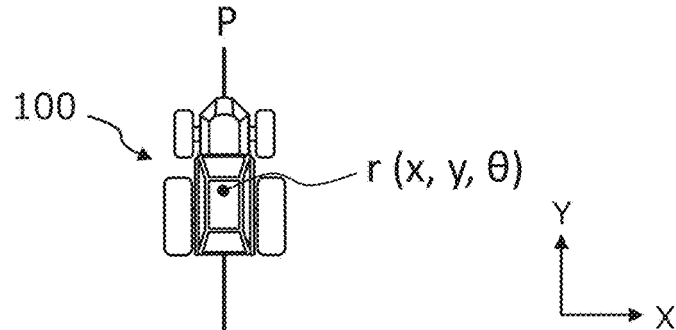
FIG. 16A is a diagram showing an example of the work vehicle traveling along a target path P.
Figure 16B:
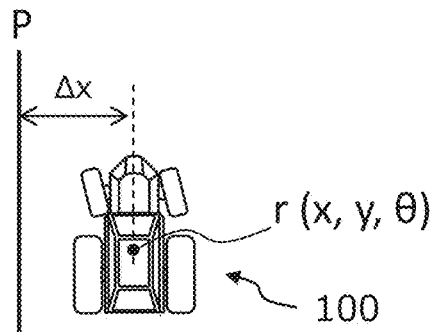
FIG. 16B is a diagram showing an example of the work vehicle at a position which is shifted rightward from the target path P.
Figure 16C:
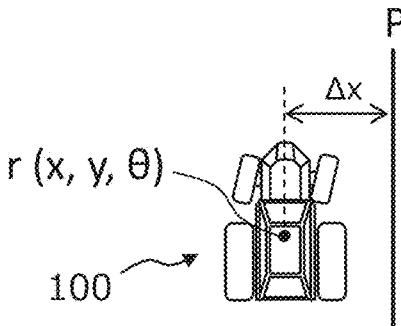
FIG. 16C is a diagram showing an example of the work vehicle at a position which is shifted leftward from the target path P.
Figure 16D:
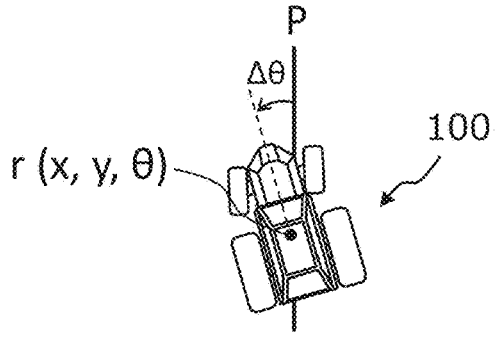
FIG. 16D is a diagram showing an example of the work vehicle oriented in an inclined direction with respect to the target path P.

FIG. 16A is a diagram showing an example of the work vehicle 100 traveling along a target path P. FIG. 16B is a diagram showing an example of the work vehicle 100 at a position which is shifted rightward from the target path P. FIG. 16C is a diagram showing an example of the work vehicle 100 at a position which is shifted leftward from the target path P. FIG. 16D is a diagram showing an example of the work vehicle 100 oriented in an inclined direction with respect to the target path P. In these figures, the pose, i.e., the position and orientation, of the work vehicle 100 as measured by the GNSS unit 110 is expressed as r(x,y,θ). Herein, (x,y) are coordinates representing the position of a reference point on the work vehicle 100 in an XY coordinate system, which is a two-dimensional coordinate system fixed to the globe. In the examples shown in FIGS. 16A to 16D, the reference point on the work vehicle 100 is at a position, on the cabin, where a GNSS antenna is disposed, but the reference point may be at any arbitrary position. θ is an angle representing the measured orientation of the work vehicle 100. Although the target path P is shown parallel to the Y axis in the examples illustrated in these figures, the target path P may not necessarily be parallel to the Y axis, in general.

As shown in FIG. 16A, in the case where the position and orientation of the work vehicle 100 are not deviated from the target path P, the controller 180 maintains the steering angle and speed of the work vehicle 100 without changing them.

As shown in FIG. 16B, when the position of the work vehicle 100 is shifted rightward from the target path P, the controller 180 changes the steering angle so that the traveling direction of the work vehicle 100 will be inclined leftward, thus bringing the work vehicle 100 closer to the path P. At this point, not only the steering angle but also the speed may be changed. The magnitude of the steering angle may be adjusted in accordance with the magnitude of a positional deviation Δx, for example.

As shown in FIG. 16C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 16D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation Δθ needs to become closer to zero. Therefore, it may be advantageous to introduce a relatively large weight (i.e., control gain) for the directional deviation Δθ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 halts the work vehicle 100. At this point, the controller 180 may cause the buzzer 220 to present an alarm sound or may transmit an alert signal to the terminal device 400. In the case where the obstacle is avoidable, the controller 180 may control the drive device 240 such that the obstacle is avoided.

The work vehicle 100 according to the present example embodiment can perform self-traveling outside a field as well as inside the field. Outside the field, the controller 180 is able to detect an object located at a relatively distant position from the work vehicle 100 (e.g., another vehicle, a pedestrian, etc.) based on data output from the cameras 120 or the LiDAR sensor 140. The controller 180 generates a local path such that the local path avoids the detected object, and performs speed control and steering control along the local path. In this manner, self-traveling on a road outside the field can be realized.

Figure 17:
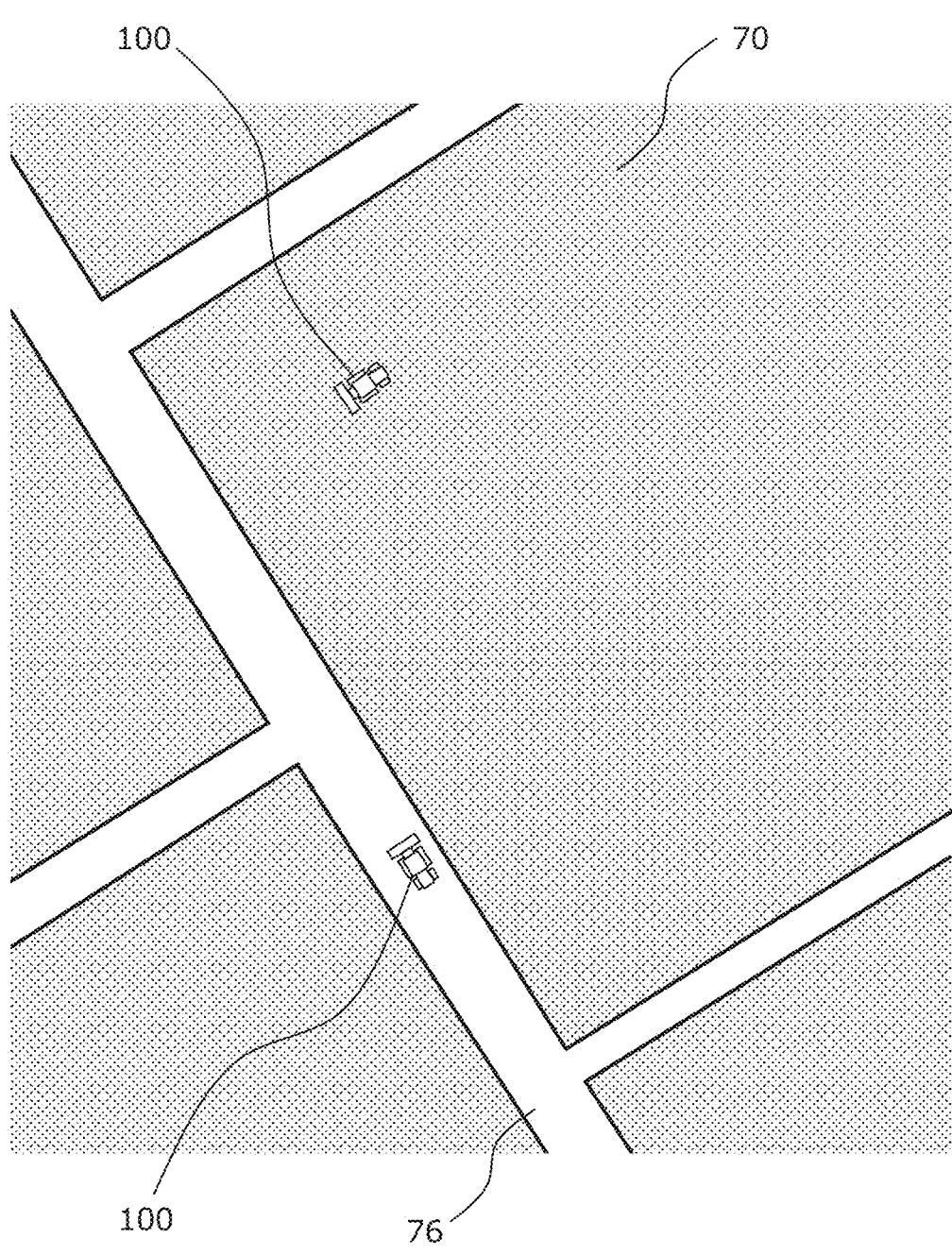
FIG. 17 is a diagram schematically showing an example of state where a plurality of the work vehicles perform self-traveling inside a field and on a road outside the field.

As described above, the work vehicle 100 according to the present example embodiment can automatically travel inside the field and outside the field in an unmanned manner. FIG. 17 is a diagram schematically showing an example of state where a plurality of the work vehicles 100 are performing self-traveling inside a field 70 and on a road 76 outside the field 70. In the storage 170, an environment map of a region including a plurality of fields and roads around the fields, and a target path, are recorded. The environment map and the target path may be generated by the management device 600 or the ECU 185. In the case of traveling on a road, the work vehicle 100 travels along the target path while sensing the surroundings thereof by use of the sensing devices such as the cameras 120 and the LiDAR sensor 140, with the implement 300 being raised. During travel, the controller 180 consecutively generates a local path and causes the work vehicle 100 to travel along the local path. This allows the work vehicle 100 to perform self-traveling while avoiding obstacles. During travel, the target path may be changed in accordance with the state.

The work vehicle 100 according to the present example embodiment automatically moves between the fields and performs agricultural work in each of the fields in accordance with a work plan created by the management device 600. The work plan includes information on one or more tasks of agricultural work to be performed by the work vehicle 100. For example, the work plan includes information on one or more tasks of agricultural work to be performed by the work vehicle 100 and on the field where each task is to be performed. The work plan may include information on a plurality of tasks of agricultural work to be performed by the work vehicle 100 over a plurality of working days and on the field where each task of agricultural work is to be performed. More specifically, the work plan may be a database including information on a work schedule indicating which agricultural machine is to perform which task of agricultural work in which field at which point of time for each working day. The work plan may be created by the processor 660 of the management device 600 based on information input by the user to the terminal device 400.

FIG. 18 is a table showing an example of schedule of agricultural work created by the management device 600. The schedule in this example includes information representing the date and time of the agricultural work, the field for the agricultural work, the contents of the work, and the implement to be used, for each of the registered agricultural machines. The schedule may include, in addition to the information shown in FIG. 18, other information in accordance with the contents of work, for example, information on the types of agricultural chemicals or the spray amounts of the agricultural chemicals. The processor 660 of the management device 600 instructs the work vehicle 100 to perform the agricultural work in accordance with such a schedule. The schedule may be downloaded by the controller 180 of the work vehicle 100 and may also stored in the storage 170. In this case, the controller 180 may spontaneously begin the operation in accordance with the schedule stored in the storage 170.

In the present example embodiment, the work plan is created by the management device 600. The work plan may be created by another device. For example, the processor 460 of the terminal device 400 or the controller 180 of the work vehicle 100 may have a function of creating or updating the work plan.

Now, an operation of path planning according to the present example embodiment will be described in more detail.

The management device 600 and the control system 160 of the work vehicle 100 according to the present example embodiment cooperate with each other to function as a path planning system for the work vehicle 100. The storage 650 stores a map including a plurality of fields and roads around the fields. The processor 660 of the management device 600 functions as a processor that generates a map and generates a path for the work vehicle 100 on the map. The management device 600 generates a path for the work vehicle 100 based on the map and a work plan. Note that a portion of, or the entirety of, a map generation process and a path generation process, which are to be performed by the management device 600, may be performed by the ECU 185 of the controller 180 of the work vehicle 100. Alternatively, a portion of, or the entirety of, the map generation process and the path generation process, which are to be performed by the management device 600, may be performed by the operational terminal 200 of the work vehicle 100 or the terminal device 400.

Figure 19:
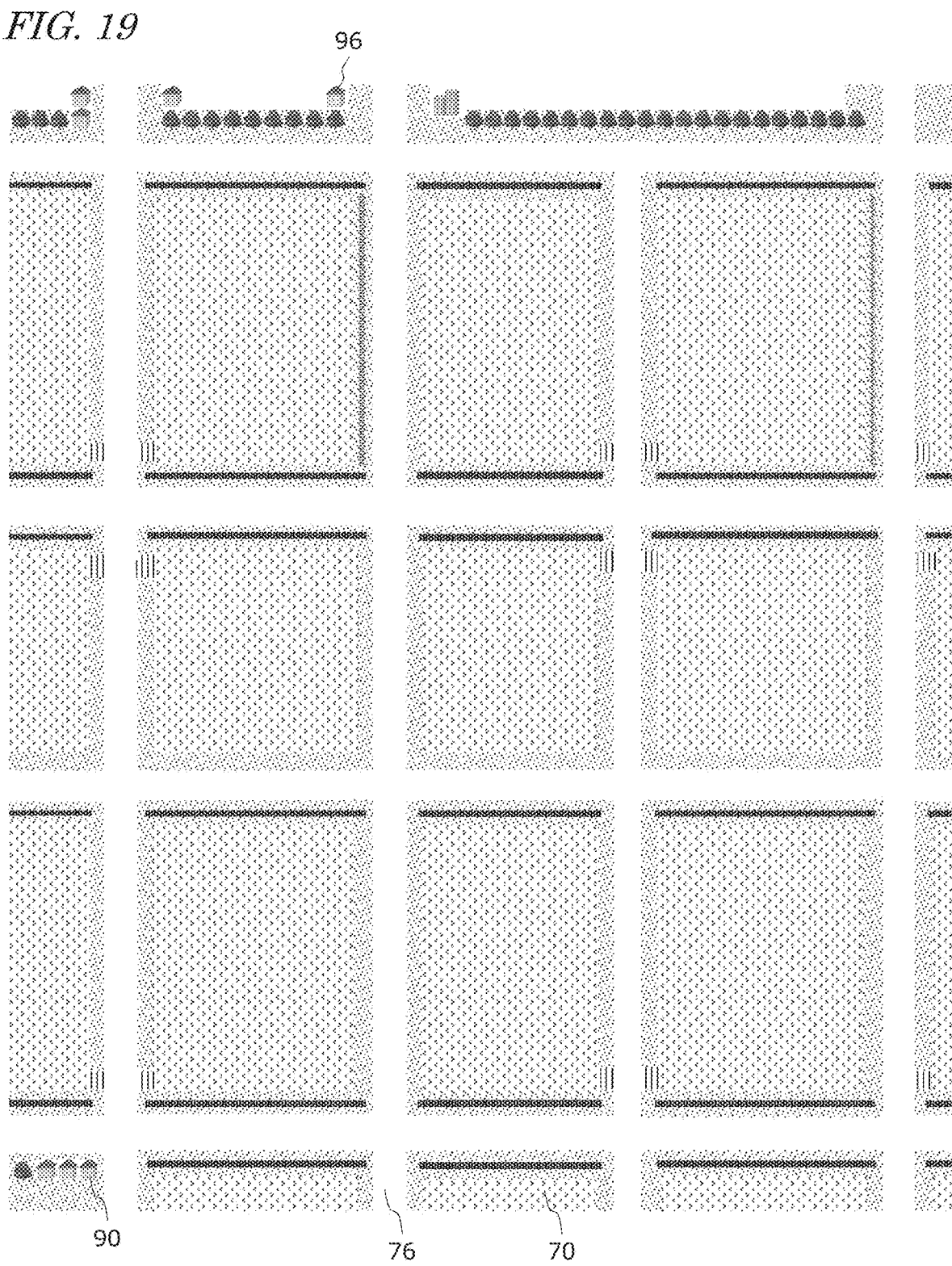
FIG. 19 is a diagram showing an example of map that is referred to at the time of path planning.

FIG. 19 is a diagram showing an example of map that is referred to at the time of path planning. This map is a two-dimensional digital map, and may be created or updated by the management device 600 or the ECU 185. The map may be generated by the method descried above with reference to FIG. 1 to FIG. 7. In the present example embodiment, before performing self-traveling, the work vehicle 100 may collect data for map generation by use of the LiDAR sensor 140 and the cameras 120 while traveling, by manual driving, along the path along which the work vehicle 100 is to travel. The map shown in FIG. 19 includes information on the position of each of points (e.g., the latitude and the longitude of each of the points) in a plurality of fields 70 where the work vehicle 100 is to perform agricultural work and roads 76 around the fields 70. The map in this example further includes positional information on a repository 90 for the work vehicle 100 and on a waiting area 96, where the work vehicle 100 is to wait temporarily. The repository 90 and the waiting area 96 may be registered by a manipulation performed by the user by use of the terminal device 400. The map as shown in FIG. 19 may be created for the entirety of a region where the work vehicle 100 may travel. Note that the map shown in FIG. 19 is a two-dimensional map, but a three-dimensional map may be used for the path planning.

The repository 90 may be, for example, a garage, a barn or a parking area adjacent to a house or an office of the user. The waiting area 96 may be, for example, a site that is managed or used jointly by a plurality of users. The waiting area 96 may be a facility such as a parking area or a garage managed or run by a regional government of a city, a town or a village, an agricultural cooperative or a corporation. In the case where the waiting area 96 is a facility locked at nighttime, the work vehicle 100 in the waiting area 96 can be prevented from being robbed. FIG. 19 shows one waiting area 96 as an example, but a plurality of waiting areas 96 may be provided. In the case where the work vehicle 100 moves around within a relatively small range, there is no need to provide the waiting area 96 separately from the repository 90.

Before the agricultural work begins on each of working days, the management device 600 reads, from the storage 650, a map of a region including the field(s) where the agricultural work is to be scheduled on that working day, and generates a path for the work vehicle 100 based on the map. More specifically, the management device 600 generates a first path, along which the work vehicle 100 is to travel while performing the agricultural work inside a field 70 (the first path is also referred to as a "tasked travel path"), on the field on the map, and generates a second path, along which the work vehicle 100 is to travel toward the field 70, on a road on the map. After generating the first path and the second path, the management device 600 connects the first path and the second path to each other to generate a global path for the work vehicle 100.

Figure 20:
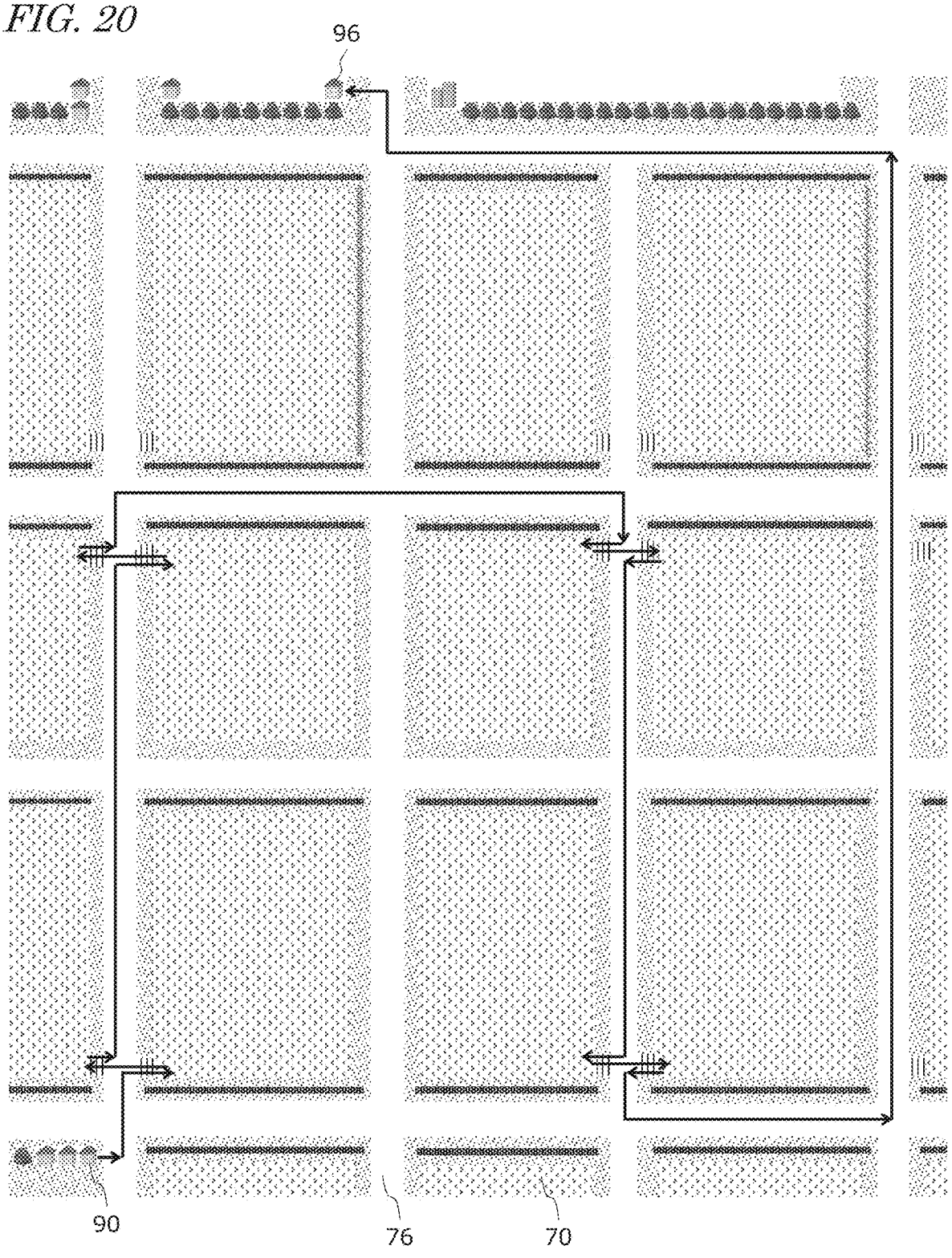
FIG. 20 is a diagram showing an example of global path.

FIG. 20 is a diagram showing an example of global path to be generated. In FIG. 20, paths, of the global path generated by the management device 600, which are generated on the roads 76 are represented by arrows. The first paths (i.e., tasked travel paths) generated inside the fields 70 are omitted. The tasked travel path is, for example, the path as shown in FIG. 14, and is connected to a second path generated on the roads 76. The arrows shown in FIG. 20 represent an example of paths for the work vehicle 100 on one working day.

In the example shown in FIG. 20, the management device 600 generates, as a path for one working day, a path along which the work vehicle 100 departs from the repository 90, sequentially passes eight fields 70 and reaches the waiting area 96. This is because the waiting area 96 is the waiting area closest to the field group, where the agricultural work is scheduled to be performed on the next working day. In the case where the group of fields where the agricultural work is to be scheduled to be performed on the next working day is close to the repository 90, the management device 600 may return the work vehicle 100 to the repository 90 after the agricultural work for the day ends. In this manner, the management device 600 may generate a path from the field where the final task of agricultural work is to be performed on each working day, to the waiting area 96 located at the shortest average distance from the group of fields where the agricultural work is to be performed on the next working day. The work vehicle 100 travels along the generated path.

In the example shown in FIG. 20, on one working day, the work vehicle 100 departs from the repository 90, and sequentially visits the fields in the field group, where the agricultural work is scheduled to be performed on the day, and performs the agricultural work indicated by the schedule in each field. In each field, the work vehicle 100 performs the agricultural work while performing self-traveling along the tasked travel path by, for example, the method described above with reference to FIG. 14 to FIG. 16D. When the agricultural work ends in one field, the work vehicle 100 enters the next field, and performs the agricultural work in substantially the same manner. The work vehicle 100 operates in this manner, and when the agricultural work ends in the field assigned to the final task of agricultural work for the day, the work vehicle 100 moves to the waiting area 96. The work vehicle 100 waits at the waiting area 96 until the next working day. On the next working day, the work vehicle 100 departs from the waiting area 96 and sequentially visits the fields in the field group, where the agricultural work is scheduled to be performed on the day, and performs the agricultural work indicated by the schedule in each field. With such an operation, the work vehicle 100 is moved efficiently along an optimal path in accordance with the schedule, so that the scheduled agricultural work can be completed.

There may be a case where while the work vehicle 100 is traveling outside the field, there is an obstacle such as a pedestrian or another vehicle on the global path or in the vicinity thereof. In order to avoid the work vehicle 100 colliding against the obstacle, while the work vehicle 100 is traveling, the ECU 185 of the controller 180 consecutively generates a local path along which the work vehicle 100 can avoid the obstacle. While the work vehicle 100 is traveling, the ECU 185 generates a local path based on sensing data acquired by the sensing device included in the work vehicle 100 (the obstacle sensors 130, the LiDAR sensor 140, the cameras 120, etc.). The local path is defined by a plurality of waypoints along a portion of the global path. Based on the sensing data, the ECU 185 determines whether or not there is an obstacle existing on the road on which the work vehicle 100 is proceeding or in the vicinity thereof. In the case where there is such an obstacle, the ECU 185 sets a plurality of waypoints such that the obstacle is avoided, and thus generates a local path. In the case where there is no such obstacle, the ECU 185 generates a local path substantially parallel to the global path. Information representing the generated local path is transmitted to the ECU 184 responsible for self-driving control. The ECU 184 controls the ECU 181 and the ECU 182 such that the work vehicle 100 travels along the local path. This allows the work vehicle 100 to travel while avoiding the obstacle. In the case where there is a traffic signal on the road on which the work vehicle 100 is traveling, the work vehicle 100 may recognize the traffic signal based on, for example, an image captured by the cameras 120 and perform an operation of halting at a red light and moving forward at a green light.

Figure 21:
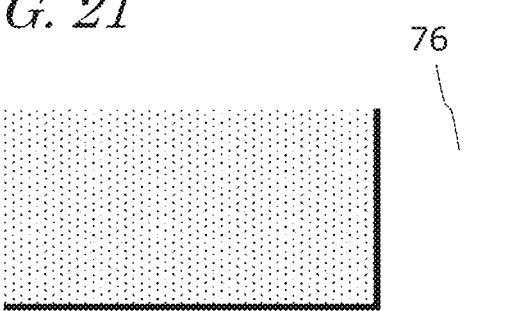
FIG. 21 is a diagram showing an example of global path and an example of local path generated in an environment where there is an obstacle.
Figure 21:
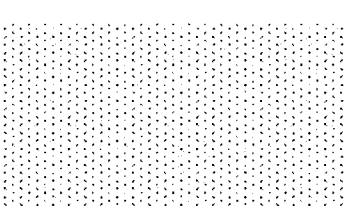

FIG. 21 is a diagram showing an example of global path and an example of local path generated in an environment where there is an obstacle. FIG. 21 represents, as an example, a global path 31 by the broken line arrows, and represents, as an example, local paths 32 consecutively generated during travel of the work vehicle 100 by the solid line arrows. The global path 31 is defined by a plurality of waypoints 31*p*. The local paths 32 are defined by a plurality of waypoints 32*p* set at a shorter interval than the waypoints 31*p*. The waypoints each have information on, for example, the position and the orientation. The management device 600 sets the plurality of waypoints 31*p* at a plurality of points including an intersection of the roads 76 to generate the global path 31. The interval between the waypoints 31*p* is relatively long, and may be, for example, about several meters to about several tens of meters. The ECU 185 sets the plurality of waypoints 32*p* based on the sensing data output from the sensing device during travel of the work vehicle 100 to generate the local paths 32. The interval between the waypoints 32*p* of the local paths 32 is shorter than the interval between the waypoints 31*p* of the global path 31. The interval between the waypoints 32*p* may be, for example, about several tens of centimeters (cm) to about several meters (m). The local paths 32 are generated in a relatively small range (e.g., a range of about several meters) from the position of the work vehicle 100. FIG. 21 shows, as an example, a series of local paths 32 generated while the work vehicle 100 travels along the road 76 between the fields 70 and turns left at the intersection. While the work vehicle 100 is moving, the ECU 185 repeats an operation of generating a local path from the position of the work vehicle 100 estimated by the ECU 184 to, for example, a point frontward of the work vehicle 100 by several meters. The work vehicle 100 travels along the local paths consecutively generated.

In the example shown in FIG. 21, there is an obstacle 40 (e.g., a human) frontward of the work vehicle 100. FIG. 21 shows a fan-shaped region as an example of range sensed by the sensing devices such as the cameras 120, the obstacle sensors 130 or the LiDAR sensor 140 mounted on the work vehicle 100. In such a state, the ECU 185 generates the local paths 32 such that the obstacle 40 detected based on the sensing data is avoided. The ECU 185 determines whether or not there is a possibility that the work vehicle 100 will collide against the obstacle 40, based on, for example, the sensing data and the width of the work vehicle 100 (including the width of the implement in the case where the implement is attached). In the case where there is a possibility that the work vehicle 100 will collide against the obstacle 40, the ECU 185 sets the plurality of waypoints 32*p* such that the obstacle 40 is avoided, and generates the local paths 32. Note that the ECU 185 may recognize the state of the road surface (e.g., being muddy, having a cave-in, etc.) based on the sensing data, in addition to the presence/absence of the obstacle 40, and in the case where a site on which it is difficult to walk is detected, may generate the local paths 32 such that the local path 32 avoids such a site. The work vehicle 100 travels along the local paths 32. In the case where the obstacle 40 cannot be avoided in whichever manner the local paths 32 may be set, the controller 180 may halt the work vehicle 100. At this point, the controller 180 may transmit an alert signal to the terminal device 400 to warn a supervisor. In the case where after the work vehicle 100 halts, the obstacle 40 is moved and it is recognized that there is no risk of collision, the controller 180 may restart the travel of the work vehicle 100.

As described above, the global path planning is performed based on the map of the environment where the work vehicle 100 is to travel. The map includes positional information on a plurality of fields in a region where the work vehicle 100 is to travel and the roads around the fields. The map may further include information representing the distribution of features existing around the roads (e.g., grass, tree, waterway, building, etc.). The information representing these features may be generated based on data acquired by the sensing device such as the LiDAR sensor or the camera while the work vehicle 100 or any other movable body is traveling. In an environment where the plants grow thick along a road or a high building is built around the road, receipt of radio waves from a GNSS satellite or travel of the work vehicle 100 may possibly be prevented. In, for example, an environment where there are trees at a high density around an agricultural road, leaves growing thick high up in the trees form a canopy and act as an obstacle or a multi-reflector against the radio waves from a satellite. For such an agricultural road, it is difficult to perform accurate positioning by GNSS. In order to avoid generation of a path on such a road, the ECU 186 may recognize a structural body based on the sensing data acquired by the sensing device while the work vehicle 100 is performing self-traveling, and reflect the recognized structural body on the map. The structural body to be recognized may be, for example, a tree, a building, a waterway, a road sign or the like. The ECU 186 may further recognize at least one of the state of the road on which the work vehicle 100 is traveling or the state of the plants in the surroundings of the work vehicle 100, based on the sensing data, and reflect the recognized state on the map.

As in the above-described example, in an environment where plants grow thick around the roads, the state of the plants change season by season, and therefore, the ease of passing along the roads may change. For example, in summer rather than in winter, the ratio of the portions of the roads that are covered with the plants is higher, and the number of roads that are difficult to pass along tends to be larger. In this situation, the ECU 186 may generate a plurality of maps in accordance with the seasons and store the maps in the storage 170. For example, the ECU 186 may generate four types of maps for spring, summer, autumn and winter. In these maps, geographical information on the fields, the roads, the waiting areas, the buildings and the like is common, but attribute information on the growing state of the plants or on whether or not it is possible to pass along the roads may be different. The plurality of maps thus generated are transmitted to the management device 600 and recorded in the storage 650. The management device 600 may extract the map, corresponding to the season when the agricultural work is to be performed, from the recorded plurality of maps, and generate a path for the work vehicle 100 based on the extracted map. This allows appropriate global path planning in accordance with the season to be realized.

The configurations and operations in the above-described example embodiments are merely examples, and the present disclosure is not limited to the above-described example embodiments. Hereinafter, other example embodiments will be described.

In the above-described example embodiments, the processor 660 of the management device 600 creates a work plan, generates an environment map, and performs global path planning for the work vehicle 100, whereas the controller 180 disposed inside the work vehicle 100 performs local path planning and travel control for the work vehicle 100. Alternatively, a portion of the operations assigned to the management device 600 may be performed by the controller 180, the operational terminal 200 or the terminal device 400. For example, the generation of the environment map and the generation of the global path may be performed by the controller 180, the operational terminal 200 or the terminal device 400.

The management device 600 may manage the operations of a plurality of agricultural machines including the work vehicle 100. In this case, the management device 600 may perform global path planning and issue travel instructions for each of the agricultural machines based on the schedule of the agricultural work to be performed by each agricultural machine.

A system performing map generation, path planning or self-driving control according to the above-described example embodiments can be mounted on an agricultural machine lacking such functions, as an add-on. Such a system may be manufactured and marketed independently from the agricultural machine. A computer program for use in such a system may also be manufactured and marketed independently from the agricultural machine. The computer program may be provided in a form stored in a non-transitory computer-readable storage medium, for example. The computer program may also be provided through downloading via telecommunication lines (e.g., the Internet).

As described above, a map generation system according to an example embodiment of the present disclosure generates map data for an agricultural machine automatically traveling on a road around a field. The map generation system includes a storage to store a plurality of feature block images respectively associated with a plurality of types of features existing around the road, and a processor configured or programmed to acquire position distribution data on one or more types of features existing around the road, the position distribution data being generated based on at least one of sensor data from a LiDAR sensor and image data from an imager, the sensor data and the image data being output while a movable body including at least one of the LiDAR sensor and the imager is moving along the road; read, from the storage, one or more types of feature block images associated with the one or more types of features; and align the feature block images in accordance with the position distribution data to generate map data on a region including the road.

According to the above-described configuration, map data suitable to, for example, path planning for the agricultural machine automatically traveling on the road around the field can be efficiently generated.

The processor may be configured or programmed to display, on a display screen, a graphical user interface (GUI) to set a width and a height of each of the plurality of feature block images, and align the one or more types of feature block images each having the width and the height set on the GUI to generate the map data.

According to the above-described configuration, the manager of the system or the user of the agricultural machine can set the width and the height of each feature block image on the GUI. As a result, the feature block image can be set to have an appropriate size in accordance with the type of the feature, and a preferred map can be easily generated.

The processor may be configured or programmed to generate the map data by a process including the following steps (S11) to (S14) regarding each of the one or more types of features.

(S11): Determine a length in a transverse direction, corresponding to a direction of the width, and a length in a longitudinal direction, corresponding to a direction of the height, of a region occupied by the feature, based on the position distribution data.

(S12): Divide the length in the transverse direction by the width of the feature block image corresponding to the feature to determine a transverse number of the feature block images.

(S13): Divide the length in the longitudinal direction by the height of the feature block image to determine a longitudinal number of the feature block images.

(S14): Align the feature block images by the transverse number in the transverse direction, and aligns the feature block images by the longitudinal number in the longitudinal direction.

As a result of the above-described process, the feature block images corresponding the features are aligned appropriately in accordance with the length, in each of the transverse direction and the longitudinal direction, of a series of regions occupied by each of the features, and thus a map can be generated. The processor may be configured or programmed to apply the above-described process in a state where the series of regions occupied by each feature is divided into a plurality of rectangular or strip-shaped regions. As a result of such a process, the feature block images can be aligned appropriately regardless of the shapes of the regions occupied by the features.

The processor may be configured or programmed to recognize the one or more types of features existing around the road based on at least one of the sensor data and the image data, and generate the position distribution data on the one or more types of features based on GNSS data output from a GNSS receiver included in the movable body and the sensor data.

According to the above-described configuration, the processor itself can be configured or programmed to generate the position distribution data, and generate the map data based on the position distribution data and the one or more types of feature block images.

The processor may be configured or programmed to recognize the one or more types of features including at least one type among grass, tree, ditch, waterway, field and building existing around the road based on at least one of the sensor data and the image data, and align the one or more types of feature block images, associated with the recognized one or more types of features, in a region where the features exist on the map data, in accordance with the position distribution data, to generate the map data.

According to the above-described configuration, map data based on the one or more types of feature block images corresponding to at least one type among grass, tree, ditch, waterway, field and building can be generated. As a result, preferred map data reflecting the types and the positional arrangement of the features around the road on which the agricultural machine is to travel can be generated.

The processor may be configured or programmed to recognize the one or more types of features existing around the road by pattern matching or segmentation based on the image data.

According to the above-described process, the features can be recognized more correctly based on the image data.

The processor may be configured or programmed to detect a width of the road based on at least one of the sensor data and the image data, and generate the map data reflecting the width of the road.

According to the above-described process, map data reflecting the width of the road more correctly can be generated. Therefore, a process of path planning or the like based on the map data can be performed more appropriately.

The processor may be configured or programmed to detect a border between the road and the one or more types of features based on at least one of the sensor data and the image data, and align the one or more types of feature block images, associated with the one or more types of features, along, and outward of, the border and dispose an image representing the road inward of the border, to generate the map data.

According to the above-described process, even in the case where the feature block image corresponding to the road is not prepared, preferred map data can be generated.

The processor may be configured or programmed to generate the position distribution data representing a distribution of latitudes and longitudes of the one or more types of features based on the GNSS data and the sensor data.

As a result, map data reflecting the distribution of the latitudes and the longitudes of the one or more types of features more correctly can be generated based on the position distribution data.

The storage may be operable to store a plurality of pixel art images, respectively representing the plurality of types of features, as the plurality of feature block images. The processor may be configured or programmed to align the pixel art images to generate the map data.

As a result, small-sized map data represented by the pixel art images can be efficiently generated.

The storage may be operable store a road block image associated with the road, as one of the plurality of feature block images. The processor may be configured or programmed to align the one or more types of feature block images associated with the one or more types of features other than the road, and the road block image associated with the road, in accordance with the position distribution data to generate the map data.

According to the above-described process, the road block image and the other feature block images can be aligned to generate preferred map data.

The processor may be configured or programmed to generate a path for self-traveling of the agricultural machine along the road based on the map data. The processor may be configured or programmed to transmit data representing the path to the agricultural machine.

The map generation system may further include a LiDAR sensor and the imager.

The map generation system may further include the movable body.

The movable body may be the agricultural machine. The movable body may be different from the agricultural machine.

A map generation method according to another example embodiment of the present disclosure is capable of generating map data for an agricultural machine automatically traveling on a road around a field. The map generation method includes acquiring position distribution data on one or more types of features existing around the road, the position distribution data being generated based on at least one of sensor data from a LiDAR sensor and image data from an imager, the sensor data and the image data being output while a movable body including at least one of the LiDAR sensor and the imager is moving along the road; reading, from a storage, one or more types of feature block images associated with the one or more types of features, and aligning the feature block images in accordance with the position distribution data to generate map data on a region including the road.

A map generation program according to still another example embodiment of the present disclosure is a computer program to generate map data for an agricultural machine automatically traveling on a road around a field. The program is stored in a computer-readable non-transitory storage medium. The program causes a computer to execute acquiring position distribution data on one or more types of features existing around the road, the position distribution data being generated based on at least one of sensor data from a LiDAR sensor and image data from an imager, the sensor data and the image data being output while a movable body including at least one of the LiDAR sensor and the imager is moving along the road; reading, from a storage, one or more types of feature block images associated with the one or more types of features; and aligning the feature block images in accordance with the position distribution data to generate map data on a region including the road.

The techniques and example embodiments according to the present disclosure are applicable to path planning systems for agricultural machines, such as tractors, harvesters, rice transplanters, vehicles for crop management, vegetable transplanters, mowers, seeders, spreaders, or agricultural robots, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A map generation system to generate map data for an agricultural machine to automatically travel on a road around a field, the map generation system comprising:
   a storage to store a plurality of feature block images respectively associated with a plurality of types of features existing around the road; and
   a processor configured or programmed to:
      display, on a display screen, a graphical user interface (GUI) for setting a width and a height of each of the plurality of feature block images;
      in response to a user setting, via the GUI, the width and the height of each of the plurality of feature block images, store the width and height in association with each corresponding feature block image in the storage;
      acquire position distribution data on one or more types of features existing around the road, the position distribution data being generated based on at least one of sensor data from a LIDAR sensor and image data from an imager, the sensor data and the image data being output while a movable body including at least one of the LiDAR sensor and the imager is moving along the road;
      read, from the storage, one or more types of feature block images associated with the one or more types of features; and
      align the feature block images each having the width and the height set on the GUI in accordance with the position distribution data to generate map data on a region including the road.

2. The map generation system of claim 1, wherein the processor is configured or programmed to generate the map data by performing a process including, regarding each of the one or more types of features:
   determining a length in a transverse direction, corresponding to a direction of the width, and a length in a longitudinal direction, corresponding to a direction of the height, of a region occupied by the feature, based on the position distribution data;
   dividing the length in the transverse direction by the width of the feature block image corresponding to the feature to determine a transverse number of the feature block images;

dividing the length in the longitudinal direction by the height of the feature block image to determine a longitudinal number of the feature block images;
   aligning the feature block images by the transverse number in the transverse direction; and
   aligning the feature block images by the longitudinal number in the longitudinal direction.

3. The map generation system of claim 1, wherein the processor is configured or programmed to:
   recognize the one or more types of features existing around the road based on at least one of the sensor data and the image data; and
   generate the position distribution data on the one or more types of features based on GNSS data output from a GNSS receiver included in the movable body and the sensor data.

4. The map generation system of claim 3, wherein the processor is configured or programmed to:
   recognize the one or more types of features including at least one of grass, tree, ditch, waterway, field and building existing around the road based on at least one of the sensor data and the image data; and
   align the one or more types of feature block images, associated with the recognized one or more types of features, in a region where the features exist on the map data, in accordance with the position distribution data, to generate the map data.

5. The map generation system of claim 3, wherein the processor is configured or programmed to recognize the one or more types of features existing around the road by pattern matching or segmentation based on the image data.

6. The map generation system of claim 3, wherein the processor is configured or programmed to:
   detect a width of the road based on at least one of the sensor data and the image data; and
   generate the map data reflecting the width of the road.

7. The map generation system of claim 3, wherein the processor is configured or programmed to:
   detect a border between the road and the one or more types of features based on at least one of the sensor data and the image data; and
   align the one or more types of feature block images, associated with the one or more types of features, along, and outward of, the border and dispose an image representing the road inward of the border to generate the map data.

8. The map generation system of claim 3, wherein the processor is configured or programmed to generate the position distribution data representing a distribution of latitudes and longitudes of the one or more types of features based on the GNSS data and the sensor data.

9. The map generation system of claim 1, wherein
   the storage is operable to store a plurality of pixel art images, respectively representing the plurality of types of features, as the plurality of feature block images; and
   the processor is configured or programmed to align the pixel art images to generate the map data.

10. The map generation system of claim 1, wherein
   the storage is operable to store a road block image associated with the road, as one of the plurality of feature block images; and
   the processor is configured or programmed to align the one or more types of feature block images associated with the one or more types of features other than the road, and the road block image associated with the road, in accordance with the position distribution data to generate the map data.

11. The map generation system of claim 1, wherein the processor is configured or programmed to generate a path for self-traveling of the agricultural machine along the road based on the map data.

12. The map generation system of claim 1, further comprising:

a LIDAR sensor; and
the imager.

13. The map generation system of claim 1, further comprising the movable body.

14. The map generation system of claim 13, wherein the movable body is the agricultural machine.

15. A computer-implemented method for generating map data for an agricultural machine to automatically travel on a road around a field, the map generation method comprising:

displaying, on a display screen, a graphical user interface (GUI) for setting a width and a height of each of the plurality of feature block images:

in response to a user setting, via the GUI, the width and the height of each of the plurality of feature block images, store the width and height in association with each corresponding feature block image in the storage;

acquiring position distribution data on one or more types of features existing around the road, the position distribution data being generated based on at least one of sensor data from a LiDAR sensor and image data from an imager, the sensor data and the image data being output while a movable body including at least one of the LiDAR sensor and the imager is moving along the road;

reading, from a storage, one or more types of feature block images associated with the one or more types of features; and aligning the feature block images each having the width and the height set on the GUI in accordance with the position distribution data to generate map data on a region including the road.

16. A map generation system to generate map data for an agricultural machine to automatically travel on a road around a field, the map generation system comprising:

a storage to store a plurality of feature block images respectively associated with a plurality of types of features existing around the road; and a processor configured or programmed to:

receive at least one of sensor data from a LIDAR sensor and image data from an imager, the sensor data and the image data being output while a movable body including at least one of the LiDAR sensor and the imager is moving along the road;

recognize one or more types of features existing around the road based on the at least one of sensor data and image data;

generate position distribution data on the one or more types of features based on GNSS data output from a GNSS receiver included in the movable body and the sensor data;

read, from the storage, one or more types of feature block images associated with the one or more types of features; and align the feature block images in accordance with the position distribution data to generate map data on a region including the road.

* * * * *